United States Patent

Uwabo et al.

[11] Patent Number: 5,995,469
[45] Date of Patent: Nov. 30, 1999

[54] DISK DEVICE HAVING MOVABLE CARTRIDGE HOLDER AND A CAM PLATE HAVING A CAM GROOVE WITH THREE SUCCESSIVE INCLINED CAM GROOVE PORTIONS

[75] Inventors: Tsuneo Uwabo; Yoshihiro Okano; Yoshinori Tangi; Eiichi Yoneyama, all of Atsugi, Japan

[73] Assignee: Mitsumi Electric Co., Ltd., Tokyo, Japan

[21] Appl. No.: 08/826,141

[22] Filed: Mar. 27, 1997

Related U.S. Application Data

[62] Division of application No. 08/501,416, Jul. 12, 1995, abandoned.

[30] Foreign Application Priority Data

| Jul. 13, 1994 | [JP] | Japan | 6-184034 |
| Sep. 26, 1994 | [JP] | Japan | 6-229886 |
| Sep. 26, 1994 | [JP] | Japan | 6-229887 |
| Sep. 29, 1994 | [JP] | Japan | 6-235766 |
| Sep. 29, 1994 | [JP] | Japan | 6-235767 |
| Sep. 29, 1994 | [JP] | Japan | 6-235768 |

[51] Int. Cl.$^6$ .................................................. G11B 17/04
[52] U.S. Cl. ................................ 369/77.2; 369/75.2
[58] Field of Search ................... 369/75.2, 77.2, 369/270–271; 360/99.02–99.03, 99.06–99.07, 98.01–98.04

[56] References Cited

U.S. PATENT DOCUMENTS

| 4,510,592 | 4/1985 | Kanamaru et al. | 369/270 |
| 4,514,086 | 4/1985 | Tanaka | 369/271 |
| 4,896,312 | 1/1990 | Odawara et al. | 369/77.2 |
| 5,195,079 | 3/1993 | Inoue et al. | 369/77.2 |
| 5,216,664 | 6/1993 | Sleegers et al. | 369/271 |
| 5,224,079 | 6/1993 | Inoue | 369/77.2 |
| 5,251,195 | 10/1993 | Kawakami et al. | 369/75.2 |
| 5,537,378 | 7/1996 | Uehara et al. | 369/77.2 |
| 5,546,370 | 8/1996 | Ishikawa | 369/77.2 |
| 5,559,649 | 9/1996 | Ito et al. | 360/99.06 |
| 5,625,612 | 4/1997 | Tozune et al. | 369/77.2 |
| 5,726,828 | 3/1998 | Kakuta et al. | 360/98.01 |

FOREIGN PATENT DOCUMENTS

| 7-130066 | 5/1995 | Japan . |
| 7-130067 | 5/1995 | Japan . |

OTHER PUBLICATIONS

Japanese Journals, Movie Television Technology, 1992/10(482), pp. 44–49, "Mini Disc as a Newt Generation Audio Media", written by Tetsuo Yoshida, (Audio Development Group, Sony Corporation, Tokyo).

Television Society Journal, vol. 47, No. 6, pp. 841–844 (1993), "Newly Developed Technologies for Audio Equipment; Mini Disc" written by Yasuaki Maeda (Audio Development Group, Sony Corporation, Tokyo).

Dig Tech Pap IEEE Int Conf Consum Electron vol. 1993, pp. 124–125, "Mini Disc System", written by Yasuaki Maeda (Audio Development Group, Sony Corporation, Tokyo).

*Primary Examiner*—Brian E. Miller
*Attorney, Agent, or Firm*—Ladas & Parry

[57] ABSTRACT

A holder holds a disk cartridge, and two reversely moving members, being engaged with the holder, either lower of lift the holder as a result of being moved along reverse directions respectively. A linking member links the two reversely moving members, the linking member being rotatably supported on the holder. Each of the two reversely moving members has a guide groove inclined along a direction reverse of another direction along which a guide groove of the other one is inclined. The disk cartridge holder is adapted to be moved in one direction by means of a cam plate movable in a second direction.

3 Claims, 31 Drawing Sheets

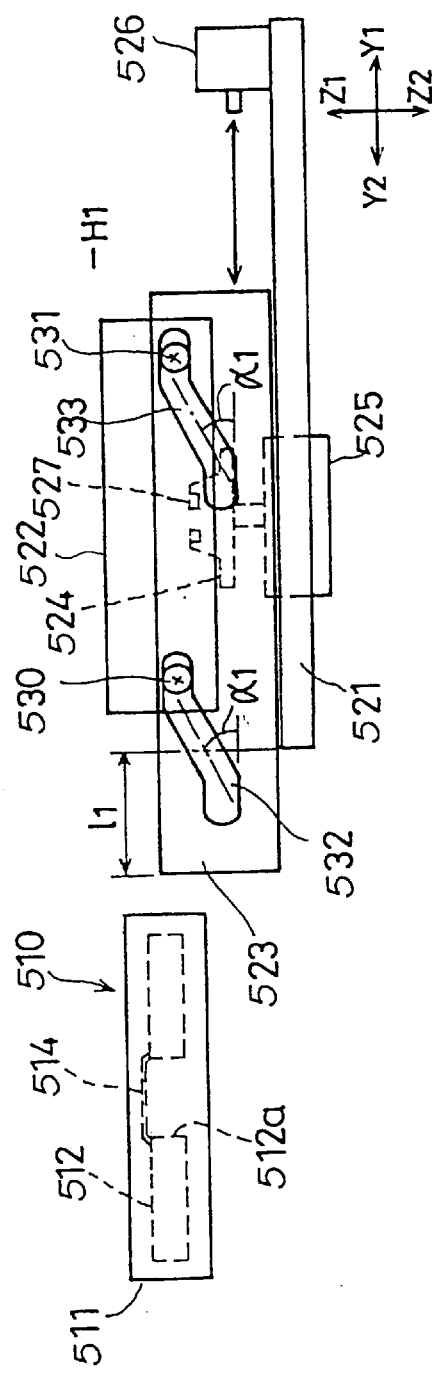
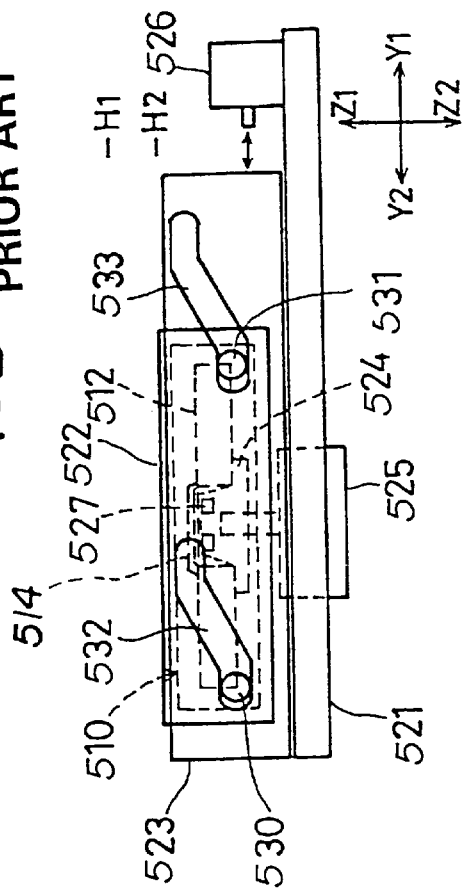
FIG.6A PRIOR ART
FIG.6B PRIOR ART

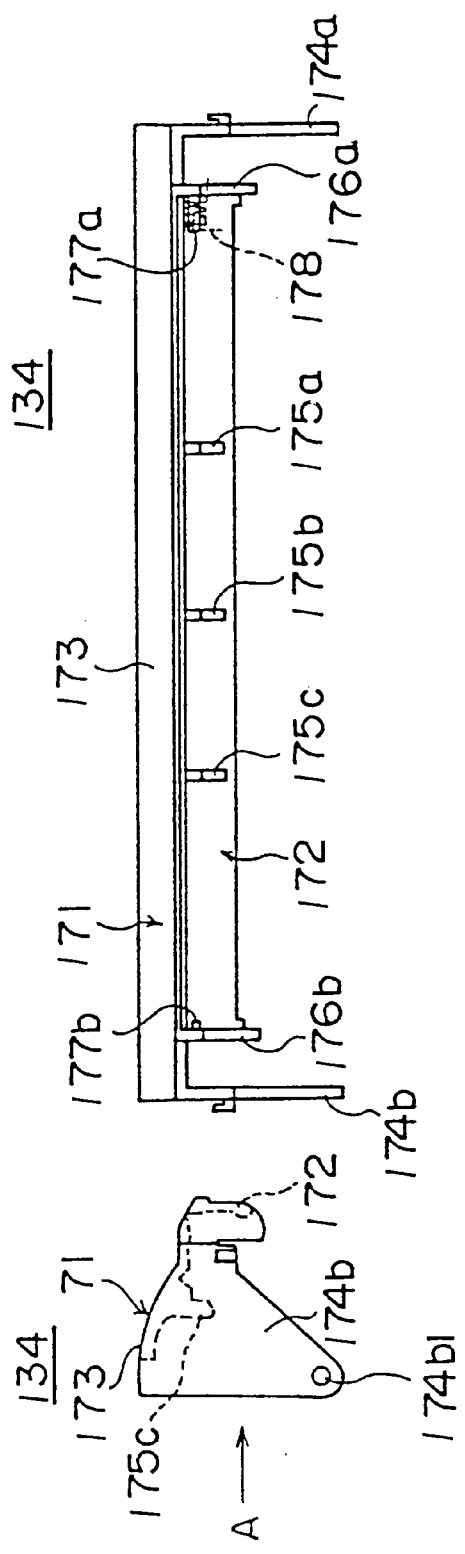

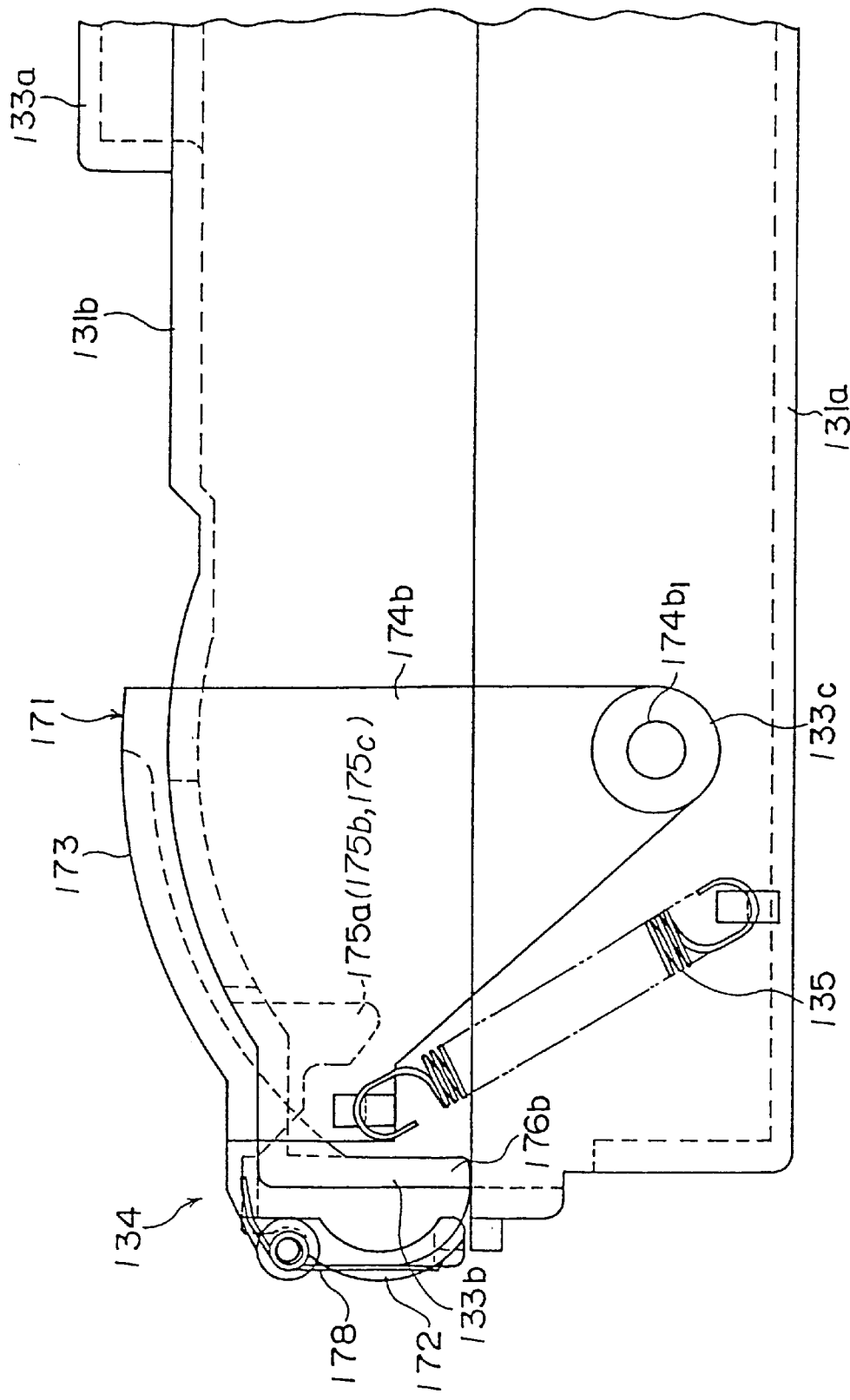

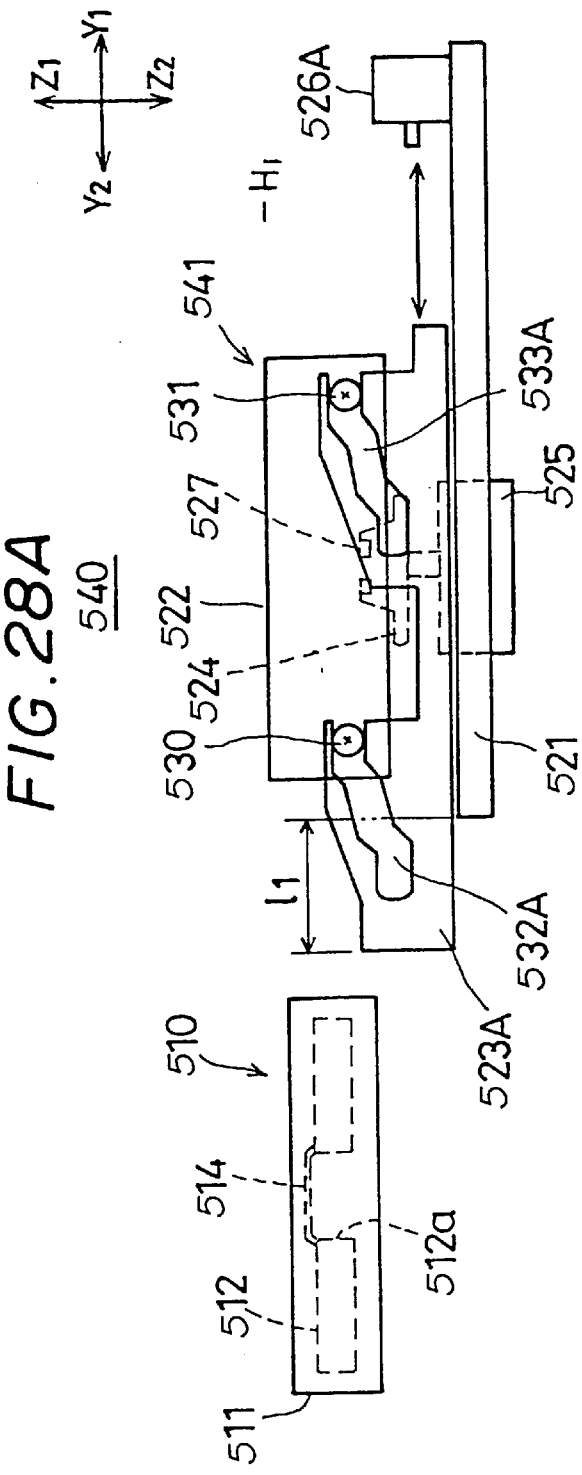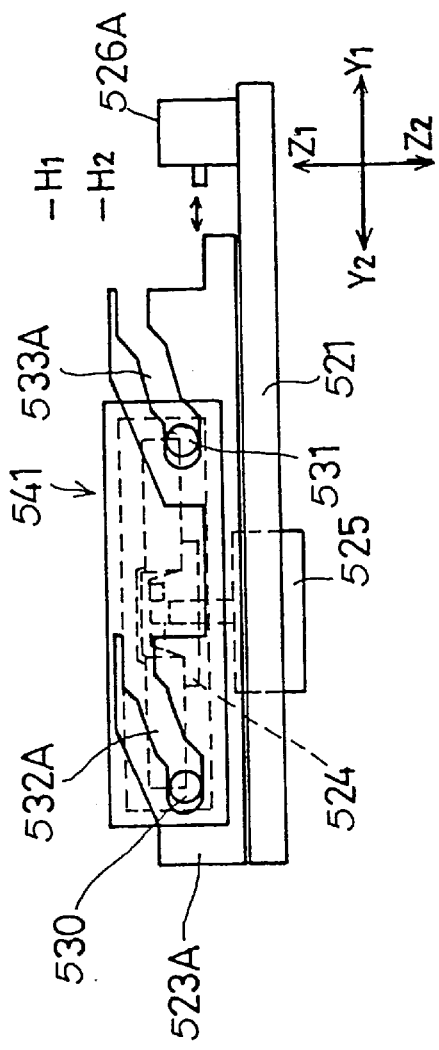

DISK DEVICE HAVING MOVABLE CARTRIDGE HOLDER AND A CAM PLATE HAVING A CAM GROOVE WITH THREE SUCCESSIVE INCLINED CAM GROOVE PORTIONS

This is a divisional of application Ser. No. 08/501,416 filed on Jul. 12, 1995, now abandoned.

BACKGROUND OF THE INVENTION

1. Field of the Invention

The present invention relates to disk devices, in particular disk devices for recording information to/reproducing information from recording medium disks (discs), such as FD (floppy disk) drive devices, CD (compact disc) drive devices, MD (mini disc) drive devices and so forth.

The mini disc is an information recording disc such as that described, for example, in the Japanese journals, *Movie Television Technology*, 1992/10(482), pages 44–49, 'Mini Disc as a Next Generation Audio Media', written by Tetsuo Yoshida, (Audio Development Group, Sony Corporation, Tokyo), and *Television Society Journal*, Vol.47, No.6, pages 841–844 (1993), 'Newly Developed Technologies for Audio Equipment; Mini Disc" written by Yasuaki Maeda (Audio Development Group, Sony Corporation, Tokyo), and also described in *Dig Tech Pap IEEE Int Conf Consum Electron* Vol.1993, pages 124–125, 'MiniDisc System', written by Yasuaki Maeda (Audio Development Group, Sony Corporation, Tokyo).

Further, the present invention relates to disk devices which perform a loading operation of drawing a disk cartridge into a holder in response to a part of the disk cartridge being inserted into the holder.

Further, the present invention relates to a disk device which automatically performs a disk loading operation and a disk unloading operation.

Further, the present invention relates to a disk device which holds a disk onto a turntable using a magnetic force.

2. Description of the Related Art

In general in a disk device such as a disc (MD) device, a rotational driving motor, a reading head and so forth are mounted on a frame of the device. In order to cause a media disc (hereinafter, referred to as a 'disc') to enter a reproducible state, it is necessary to convey the disc, held by a disc holder, to a position adjacent to the rotational driving motor, reading head and so forth.

FIGS. 1 and 2.show a lift type disc (MD) device in the related art which will now be described. A collet B (rotational driving motor) for rotating a disc contained in a MD disc cartridge MD and a reading head C for reading information stored in the disc are attached onto a frame A of the device.

A disc holder D for holding the MD disc cartridge MD is placed at a center of a top surface of the frame A. A pair of lift cam plates $F_1$, $F_2$ are placed at two sides of the disc holder D, and can move along an MD disc cartridge loading direction as sliding on guiding pins E provided on the top surface of the frame A. The lift cam plates $F_1$ and $F_2$ are coupled with each other through an eject plate G extending along a direction perpendicular to the MD disc cartridge loading direction.

In detail, a respective one of force applying springs H are laid between each one of the lift cam plates $F_1$ and $F_2$ and the frame A. Due to the force applying springs H, the eject plate G and lift cam plates $F_1$, $F_2$ are pulled forward in FIG. 1. A plurality of following pins I are projected from each side wall of the disc holder D and are inserted into lift cams f formed in the lift cam plates $F_1$ and $F_2$. Movement of the following pins I are guided by the lift cams f.

Movement preventing nails J are projected from the frame A shown in the figures, and are engaged with some of the following pins I. The engagement prevents the disc holder D from moving along the top surface of the frame A in response to movement of the lift cam plates $F_1$ and $F_2$.

In the disc (MD) device, in response to the ejecting plate G being pressed against the pulling force due to the spring H, the lift cam plates $F_1$ and $F_2$ fixed to the eject plate G slide together. As a result, due to the function of the lift cams f, the disc holder D is lowered to enter a reproducible state as shown in FIG. 2. In the state, reproduction of information from the disc through the reading head C can be performed.

In the disc (MD) device, the eject plate G is provided between the frame A and the disc holder D. Accordingly, a lift/lower stroke of the disc holder D is elongated, and the disc (MD) device becomes thicker due to the thickness of the eject plate G. Thus, miniaturizing of the disc (MD) device is difficult. Further, the lift cam plates $F_1$ and $F_2$ are fixed to the eject plate by spot welding and thus an angular 'C'-shaped assembly is obtained. Therefore, it is difficult to ensure that the entire surface is lying in the same plane. It is needed that the assembly is in a plane coincident with a plane of the top surface of the frame A. However, ensuring the entire surface to lie in the same plane in use of the spot welding is difficult and thus the yield of the product is not good.

Recently, use of FD, CD, LD (laser disc), MO (magneto-optical disc), and MD are common when a disk (disc) is used as a recording medium for recording/reproducing information. For example, light and a magnetic field are used for recording information on/reproducing information from the MD. Therefore, an optical head for recording/reproducing, a magnetic head for recording, and various disk driving mechanisms are provided in the disk device.

FIG. 3 shows an exploded structure of a mini-disc device in the related art. In the mini-disc device 111, a driving unit 113 is attached inside an enclosure frame 112 and a cover 114 covers the enclosure frame 112.

In the driving unit 113, a loading mechanism having a holder 113b for holding a disc cartridge 115 and a recording/reproducing mechanism having an optical head and a magnetic head for recording/reproducing are provided on a unit frame 113a. The disc cartridge 115 contains, for example, a 2.5-inch magneto-optical disc 115a. A part, extending along a radial direction, of the disc 115a is bared as a result of a shutter 115b sliding in response to the disc cartridge 115 being loaded into the holder 113b.

A front bezel 116 is provided at the front of the enclosure frame 112, and is provided with a disc cartridge 115 inserting hole 116a and an eject button 116b. In the inserting hole 116a, a shutter 117 is provided in a manner in which the shutter 117 can rotate along a disc cartridge 15 inserting direction.

When the disc cartridge 115 is inserted into the inserting hole 116a of the front bezel 116, it is necessary to open the shutter 117 by pressing it and thus the disc cartridge 115 is inserted and thus loaded into the holder 113b of the driving unit 113.

FIGS. 4A and 4B illustrate an operation of the shutter 117 shown in FIG. 3. FIG. 4A shows a state before the disc cartridge 115 is inserted into the inserting hole 116a. In the state, the shutter 117 closes the inserting hole 116a.

When the disc cartridge 115 is inserted into the inserting hole 116a, the shutter 117 is pressed and thus opened.

During insertion of the cartridge 115 into the holder 113b, the shutter 117 opened state is maintained as shown in FIG. 4B. When the insertion of the disc cartridge 115 into the holder 113b has been completed, the holder 113b is lowered. Then, the top surface of the rear end of the disc cartridge 115 continues to be in contact with the shutter 117.

When the disc cartridge 115 is ejected from the disc device, the holder 113b is lifted and a predetermined length of the disc cartridge 115 is pressed out from the inserting hole 116a a predetermined distance.

Thus, an opened state of the shutter 117 is maintained as a result of being lifted by the disc cartridge 115 after the disc cartridge 115 has been loaded into the disc device. In this state, the rear end surface of the cartridge 115 closes a part of the inserting hole 116a.

In general, it is understood that it is not likely that optical disc devices such as the above-described mini-disc device, compact disc device and so forth are adversely affected by dirt/dust. Therefore, no special dirt/dust protection is provided therefor.

However, use of a mini-disc device, compact disc device and so forth as an external storing device for a computer or the like has been started. In such a case, differently from a case in which music data is reproduced, an error rate is strictly controlled. If in a mini-disc device, such as the above-described device 111, an opened state of the shutter 117 is maintained as a result of being lifted by the cartridge 115 after the disc cartridge 115 has been loaded into the disc device, as mentioned above, it is likely that dirt/dust will enter through the opened inserting hole 116a. As a result, dirt/dust may adhere to the disc 115a, the optical head, a pickup lens and so forth. Thus, the error rate may be degraded and thus data security may be degraded.

As shown in FIG. 5A, a mini-disc device 301 in the related art is provided with a holder 302 and a drawing mechanism 303. In a mini-disc cartridge 360, a cartridge body 361 contains, as also shown in FIG. 19, a magneto-optical disc 362. A concave portion 366 is formed at a part, near to the inserting-direction forward end, of the right side wall along the inserting direction of the cartridge body 361.

The above-mentioned drawing mechanism 303 has an engaging piece 304 for engaging with the above-mentioned concave portion 366, a slider 305 for supporting the engaging piece 304, a compression spring 306 for pressing the engaging piece 304 along a $X_2$ direction shown in FIG. 5A and a loading motor 307 for moving the slider 305 along $Y_1$ and $Y_2$ directions. The engaging piece 304 is in a state in which the piece 304 projects inside the holder 302.

How the mini-disc cartridge 360 is loaded in the mini-disc device 301 will now be described.

A part of the mini-disc cartridge 360 is inserted into the device 301 manually as follows: An operator inserts the mini-disc cartridge 360 into the holder 302 along the $Y_1$ direction to enter a state shown in FIG. 5B. At a last step of the insertion, a corner of the cartridge body 361 presses the engaging piece 304 along an $X_1$ direction. Thus, when the insertion has been completed, the engaging piece 304 is engaged with the concave portion 366 and holds the cartridge 360 due to an elastic force of the compression spring 306, as shown in FIG. 5B.

Then, a drawing operation is performed as follows: When the cartridge 360 has been inserted to enter the state shown in FIG. 5B, the drawing mechanism 303 operates. Specifically, the loading motor 307 is started and rotates forwardly. As a result, the slider 305 slide along the $Y_1$ direction, and thus the cartridge 360 is drawn into the holder 302 as shown in FIG. 5C. Then, the holder 302 is lowered (is moved along a direction perpendicular to a plane on which FIG. 5C is printed), and thus the cartridge 360 is loaded in the device 301. In this state, recording information on/reproducing information from the disc 362 is performed.

When the cartridge 360 is then unloaded from the device 301, a pressing operation is performed as follows: When an eject button is pressed, the motor 307 is started and rotates reversely. As a result, the holder 302 is lifted and then the slider 305 slides along the $Y_2$ direction. Thereby a part of the cartridge 360 is pressed out from the holder 302 and thus enters the state shown in FIG. 5B. In this state, the operator may pull out the cartridge 360 from the holder 302 as shown in FIG. 5A by pulling the cartridge 360 along the $Y_2$ direction.

The above-described disc device 301 has the following problems:

It is likely that the loading operation of the cartridge 360 is unstable. This is because the cartridge 360 is pressed with a force F due to the spring 306 along the $X_2$ direction after the cartridge 360 has been drawn in the holder 302. As a result, it is likely that the cartridge 360 is inclined so as to rotate in FIGS. 5B and 5C, and thus the loading operation may be not performed smoothly.

Further, the cartridge 360 inserting operation and drawing out operation may require a rather strong force to be applied by the operator. This is because, to achieve each of these operations by the operator's hand, it is necessary to cause the cartridge 360 to press the engaging piece 304 against the elastic force applied by the spring 306. This pressing out operation may require the rather strong force to be applied by the operator.

FIGS. 6A and 6B show a mechanism for loading/unloading of a disc cartridge in a mini-disc device in the related art. FIG. 6A shows a state before the loading is performed (after the unloading has been performed). FIG. 6B shows a state after the loading has been performed.

In a mini-disc cartridge 510 also shown in FIG. 27, a cartridge body 511 contains a magneto-optical disc 512 and has a shutter 513 attached thereto. An iron-made clamp plate 514 is provided to the magneto-optical disc 512 so as to cover a center hole 512a of the disc.

The mini-disc device 520 has a chassis 521, a holder 522, a lift/lower cam plate 523, a turntable 524, a disc motor 525, and a loading motor 526. A permanent magnet 527 is incorporated in the turntable 524. The holder 522 is provided in a manner in which the holder 522 can be lifted and lowered, and the holder 522 has projections 530 and 531 at a side wall. The lift/lower cam plate 523 has inclined cam grooves 532 and 533 therein. The projections 530 and 531 are fitted to the inclined cam cut-outs 532 and 533, respectively. Each of the inclined cam cut-outs 532 and 533 has a straight portion extending at an angle $\alpha_1$ as shown in FIG. 6A.

When the cartridge 310 is inserted into the holder 522, the loading motor 526 is started and rotates forwardly. As a result, as shown in FIG. 6B, the lift/lower plate 523 slides along a $Y_1$ direction, and thus the holder 522 is lowered along a $Z_2$ direction to a height $H_2$ as the projections 530 and 531 are guided by the inclined cam cut-outs 532 and 533, respectively. The cartridge 510 is lowered together with the holder 522 and thus the cartridge 510 is loaded. The clamp plate 514 of the magneto-optical disc 512 is magnetically attracted by the permanent magnet 527 and thus the disc 512 is loaded on the turntable 524. Thus, the loading of the mini-disc cartridge 510 is completed.

Then, the magneto-optical disc 512 is rotated by the disc motor 525 and then recording information on/reproducing information from the disc 512 is performed.

Then, after the information recording/reproducing has been finished, an ejecting operation may be performed. As a result, the disc motor 525 is stopped, and the loading motor 526 is started and rotates reversely. Thus, the loading motor 526 moves the lift/lower cam plate 523 a predetermined distance $l_1$ along a $Y_2$ direction, as shown in FIG. 6A. At this time, the inclined cam cut-outs 532, 533 guide the projections 530, 531, respectively, and thus the holder 522 is lifted along a $Z_1$ direction to an original height $H_1$.

The mini-disc cartridge 510 is lifted together with the holder 522. At this time, the clamp plate 514 is removed from the permanent magnet 527 and thus the magneto-optical disc 512 is removed from the turntable 524. Thus, the unloading of the mini-disc cartridge 510 is completed.

The above-mentioned distance 1 is limited to a predetermined distance in order to miniaturize a depth of the mini-disc device 520. A load borne by the loading motor 526 during the loading operation is approximately uniform.

A load to be borne when the holder 522 is lifted in the unloading operation will now be considered. When the clamp plate 514 is removed from the permanent magnet 527, a load is increased accordingly. After the removal, the load is decreased to be approximately uniform. Further, each of the inclined cam cut-outs 532, 533 has the straight portion extending at the angle $\alpha_1$. Therefore, the load to be borne by the loading motor 526 varies in a manner, as indicated by a broken-line curve I shown in FIG. 29, in which the load has a peak value when the magneto-optical disc 512 is removed from the turntable 524.

In order to bear this load, the loading motor 526 has characteristics for generating a torque overcoming the peak load Lmax1 shown in FIG. 29. Such a motor is relatively expensive and has a large size. Accordingly, the mini-disc device 520 is costly and large.

FIG. 7 shows a turntable 610 of a mini-disc device in the related art. The turntable 610 is made from plastic or metal and has a center hub portion 611 and ring-shaped table portion 612. A ring-shaped permanent magnet 613 is fixed in the center hub portion 611. The table portion has a table surface 614 which is a plastic-made or metal-made surface.

In a magneto-optical disc cartridge 620 as shown in FIG. 7, a magneto-optical disc 622 is contained in a cartridge body 621. A center hole 623 is formed in the magneto-optical disc 622 and a central ring portion 624 is provided in the periphery of the center hole 623. Further, a iron-plate-made clamp plate 625 is fixed to the central ring portion 624 so as to cover the center hole 623.

The magneto-optical disc 622 is loaded on the turntable 610 as the center hole 623 is fitted by the center hub portion 611 as indicated by chain double-dashed lines in FIG. 7. In this state, the clamp plate 625 is attracted due to a magnetic force of the permanent magnet 613, and thus the magneto-optical disc 622 is pulled along a direction $Z_2$ and the central ring portion 624 is pressed on the table surface 614. Due to a static friction force functioning between the central ring portion 624 of the disc 622 and the table surface 614 of the table portion 612, the disc 622 is fixed on the turntable 610.

The central ring portion 624 of the magneto-optical disc 622 is made from synthetic resin, and the table surface 614 is a plastic or metal surface. As a result, a static friction coefficient between the disc 622 and turntable 610 is small. Therefore, it is likely that the disc 622 slides on the turntable 610. If the sliding occurs during a state in which the disc 622 is driven through the turntable 610, a rotation speed of the disc unexpectedly varies and thus normal information recording on/reproducing from the disc 622 cannot be performed. In order to prevent such a situation, a magnetic coercive force of the permanent magnet 613 is large.

A disc device which is currently used for recording/reproducing audio signals may be used as information memory means incorporated in a computer apparatus. However, a disc rotation speed for the information memory means is double or triple than that for the audio signal case. As a result, it is likely that the sliding of the disc on the turntable will occur. Thus, the disc device in the related art may not be suitable for the high rotation speed use.

Further, because the magnetic coercive force of the magnet 613 is large as mentioned above, a relatively strong force is required to remove the disc from the turntable. As a result, a high-power loading motor is needed, and thus miniaturization of the disc device is difficult.

SUMMARY OF THE INVENTION

In considering the problems mentioned with reference to FIGS. 1 and 2, a first object of the present invention is to provide a structure of a disk device for which a high assembling accuracy is not needed and a lift/lower stroke of the disk holder is shortened.

A disk device according to the present invention, comprises:
  a holder for holding a disk; and
  two reversely moving members, being engaged with said holder, for either lowering or lifting said holder as a result of being moved along reverse directions respectively.

It is preferable that a linking member is further provided for linking said two reversely moving members, said linking member being rotatably supported on said holder. Further, it is also preferable that each of said two reversely moving members has a guide groove inclined along a direction reverse of another direction along which a guide groove of the other one is inclined.

In consideration of the problem mentioned above with reference to FIGS. 3 and 4, a second object of the present invention is to provide a disk device in which an entrance of dirt/dust is prevented and thus data security can be improved.

Another disk device according to the present invention comprises:
  a driving unit for performing information recording/reproducing operations on a recording medium disk contained in a cartridge; and
  a cover unit for covering said driving unit for preventing dirt/dust from entering said driving unit.

It is preferable that shutter means is further provided which is provided at a cartridge inserting position of said cover unit, said shutter means being opened and closed appropriately in response to cartridge insertion. Further, it is also preferable that said cover unit is provided in an enclosure frame of said disk device. Further, it is also preferable that resilient members are provided between said cover unit and enclosure frame.

Another disk device according to the present invention comprises:
  a driving unit for performing information recording/reproducing operations on a recording medium disk contained in a cartridge; and
  a rotational body having a lid portion provided at a cartridge inserting position of said disk device, which lid portion can be opened and closed;

a contacting portion being provided on said rotational body, said rotational body being rotated in response to said cartridge inserted pressing said contacting portion, said cartridge removing from said contacting portion, in response to said cartridge being loaded in said disk device, and thus said rotational body being returned, said lid portion closing said cartridge inserting position.

It is preferable that a cover unit is further provided for covering said driving unit, said rotational body being provided to said cover unit. Further, it is also preferable that said cover unit is provided in an enclosure frame of said disk device.

A third object of the present invention is to provide a disk device which can solve the problems mentioned above with reference to FIGS. 5A, 5B and 5C.

A disk device according to the present invention comprises:

an engaging member; and a movement mechanism for causing said engaging member to be loosely engaged with a disk in response to a disk cartridge being inserted into said disk device, said mechanism causing said engaging member to be disengaged from said disk cartridge in response to said disk cartridge projecting from said disk device.

It is preferable that:

said movement mechanism moves said engaging member to a loading position such that a disk contained in said disk cartridge may be loaded in said disk device after said disk cartridge has been moved by said engaging member as said engaging member has moved to said loading position; and said movement mechanism moves said engaging member to a projecting position such that an operator may draw out said disk cartridge after said disk cartridge has been moved by said engaging member as said engaging member has moved to said projecting position.

A fourth object of the present invention is to provide a disk device which can solve the problem mentioned above with reference to FIGS. 6A and 6B.

A disk device according to the present invention comprises:

a holder for holding a disk cartridge, said holder having a projection formed therein;

a cam plate having an inclined cam cut-out formed therein, said projection of said holder being inserted in said inclined cam cut-out so that said holder is moved along a first direction in response to said cam plate moving along a second direction different from said first direction, said inclined cam cut-out extending along different inclined angles in turn.

It is preferable that said different inclined angles of said inclined cam cut-out are such that a power transmission ratio between said cam plate and said holder is controlled depending on a position at which said projection is located in said inclined cam groove. A turntable may be provided for loading thereon a disk contained in said disk cartridge, and a magnet may be provided in said turntable for attracting a clamp plate provided in said disk. Said different inclined angles of said inclined cam cut-out may be such that a load borne by said cam plate is reduced when movement of said holder along said first direction due to movement of said cam plate along said second direction causes said cam plate of said disk to be removed from said magnet of said turntable.

A fifth object of the present invention is to provide a disk device which can solve the problems mentioned above with reference to FIG. 7.

A disk device according to the present invention comprises:

a turntable for loading a disk thereon;

a magnet provided in said turntable for magnetically attracting said disk; and a sheet, made of either a rubber or a material having properties similar to those of the rubber, provided in said turntable for preventing slipping of said disk on said turntable.

It is preferable that said sheet is compressed by said disk as said disk approaches said magnet due a magnetic attracting force of said magnet. Further, it is also preferable that a stopper is further provided for preventing said disk from approaching said magnet too closely, so that a position of said disk on said turntable is fixed.

Another disk device according to the present invention comprises:

a turntable for loading a disk thereon;

a magnet provided in said turntable for magnetically attracting said disk; and a film, made of either a rubber or a material having properties similar to those of the rubber, provided on said turntable for preventing slipping of said disk on said turntable.

Other objects and further features of the present invention will become more apparent from the following detailed description when read in conjunction with the accompanying drawings.

BRIEF DESCRIPTION OF THE DRAWINGS

FIGS. 6A and 6B generally show a structure and operation of a disc device in the related art;

FIGS. 14A and 14B show a structure of a shutter mechanism unit shown in FIG. 11;

FIG. 15 shows a magnified side elevational sectional view of a portion at which the shutter mechanism unit is fitted to the inner cover unit;

FIGS. 28A and 28B illustrate a cartridge loading operation and a cartridge unloading operation in the mini-disc device in the fourth embodiment;

DESCRIPTION OF PREFERRED EMBODIMENTS

Figure 8:
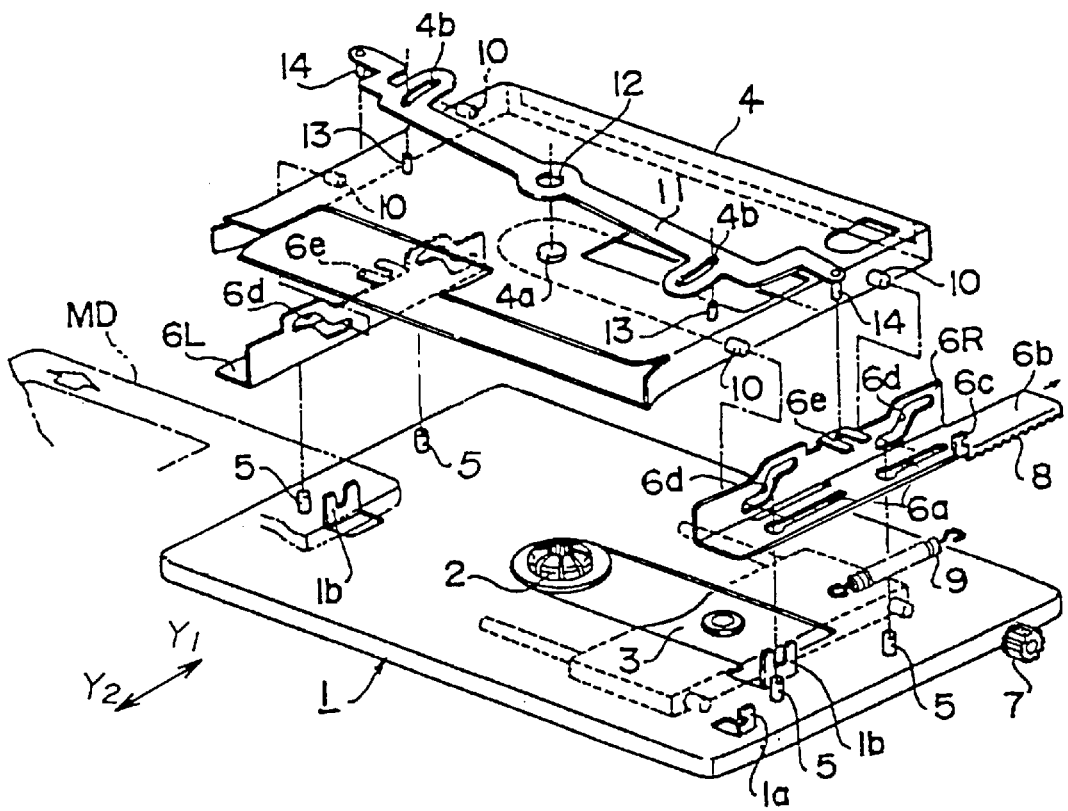
FIG. 8 shows a general exploded perspective view of a disc (MD) device in a first embodiment of the present invention.
Figure 9:
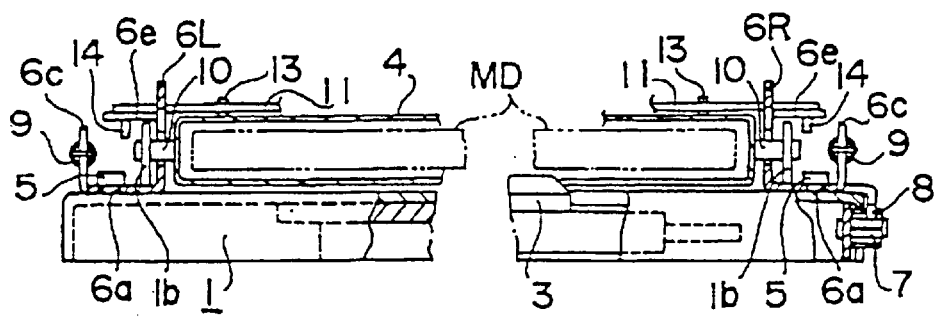
FIG. 9 shows a partial magnified elevational sectional view of the disc (MD) device shown in FIG. 8 in the reproducible state.

With reference to FIGS. 8 and 9, a first embodiment of the present invention will now be described.

Figure 1:
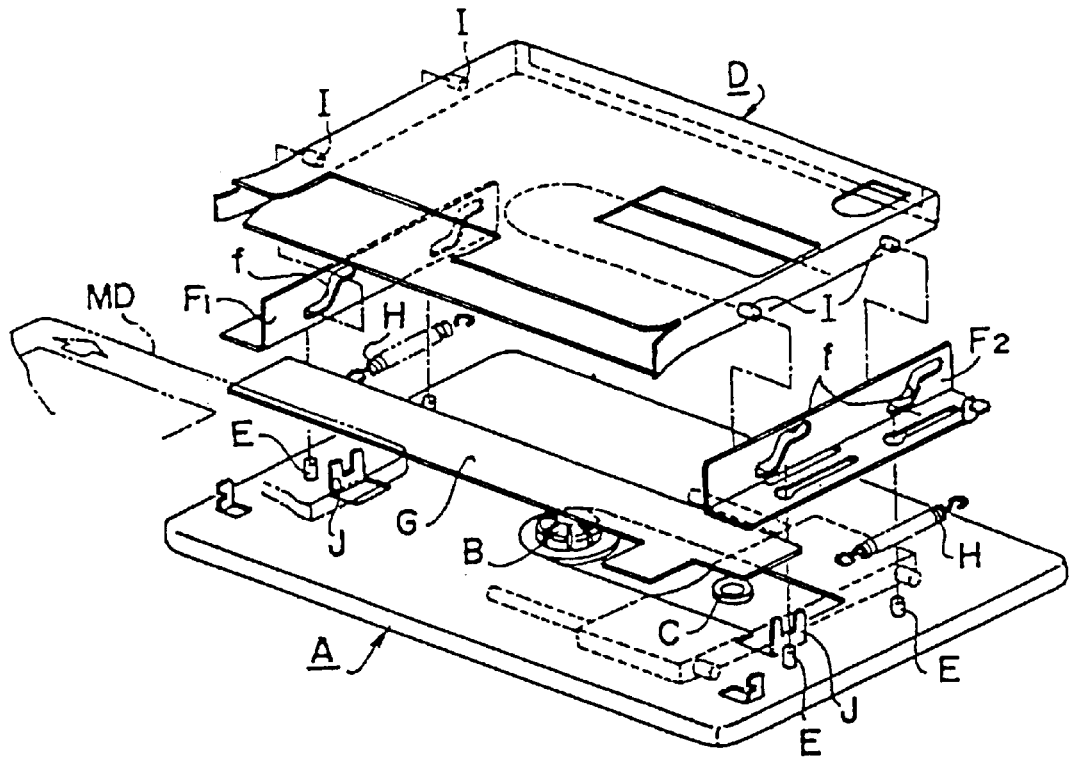
FIG. 1 shows a general exploded perspective view of a disc (MD) device in the related art.
Figure 2:
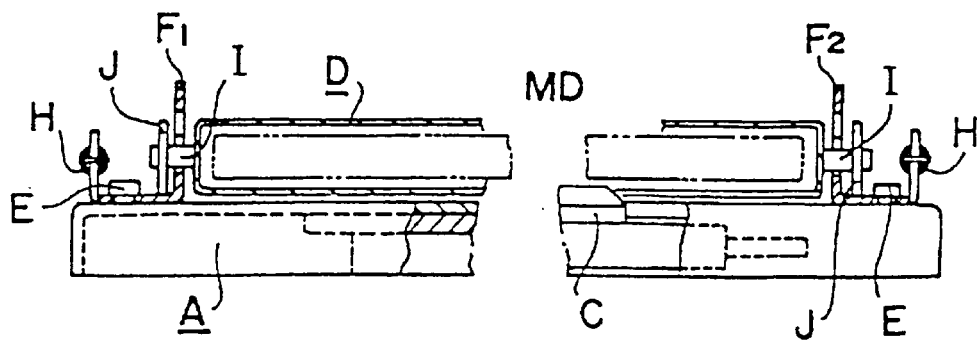
FIG. 2 shows a partial magnified elevational sectional view of the disc (MD) device shown in FIG. 1 in the reproducible state.
Figure 3:
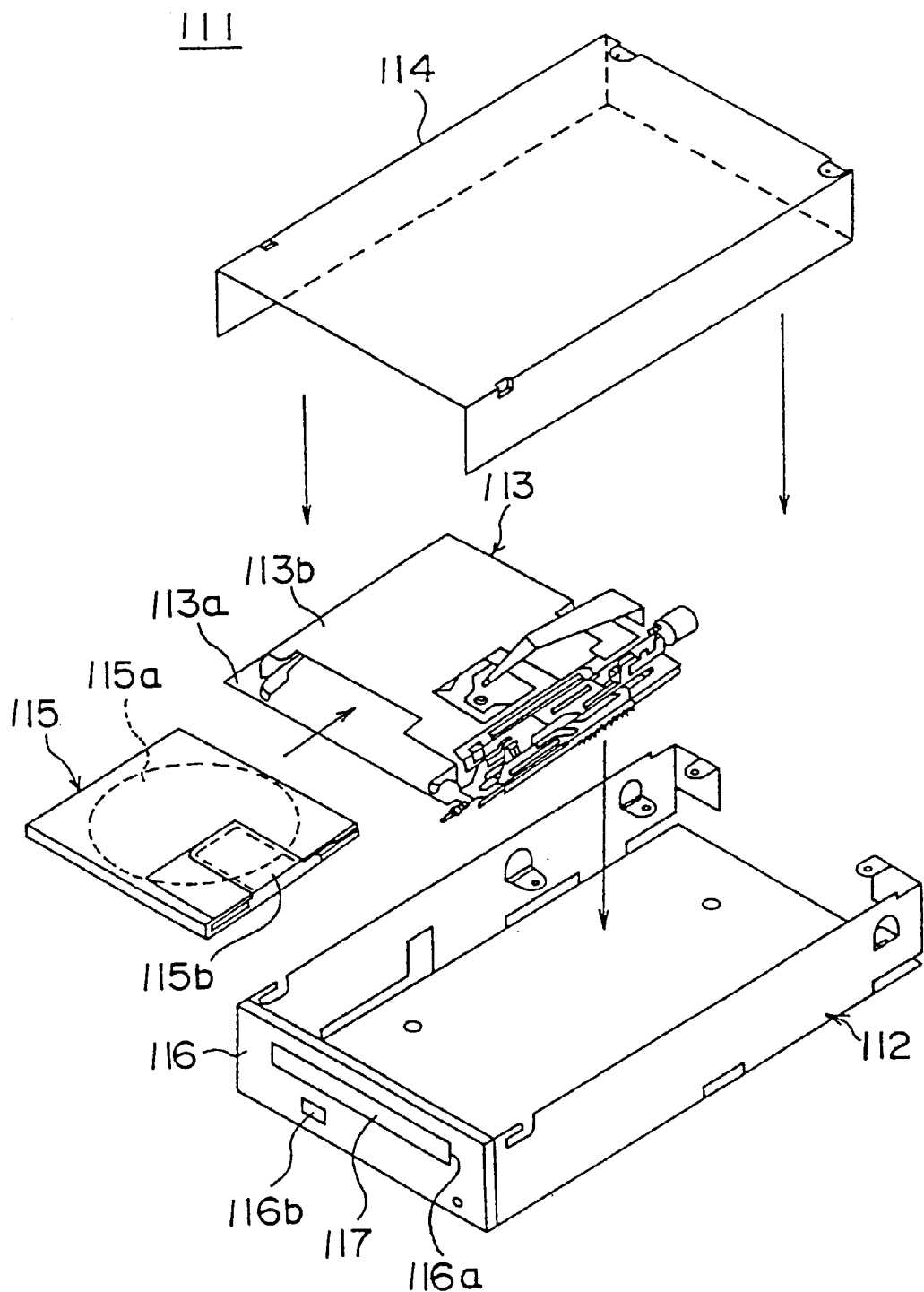
FIG. 3 shows an exploded perspective view of a mini-disc device in the related art.
Figure 4A:
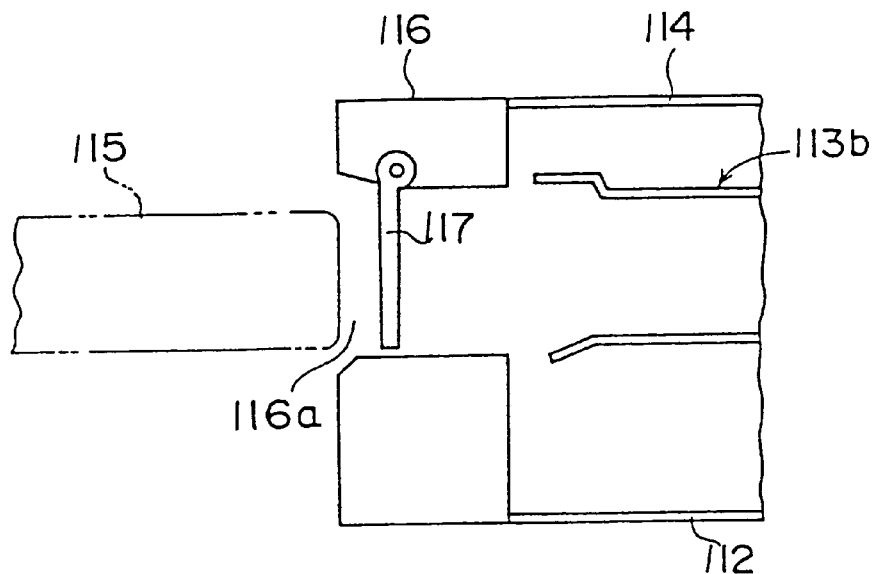
FIGS. 4A and 4B illustrate a shutter operation in the mini-disc device shown in FIG. 3.
Figure 4B:
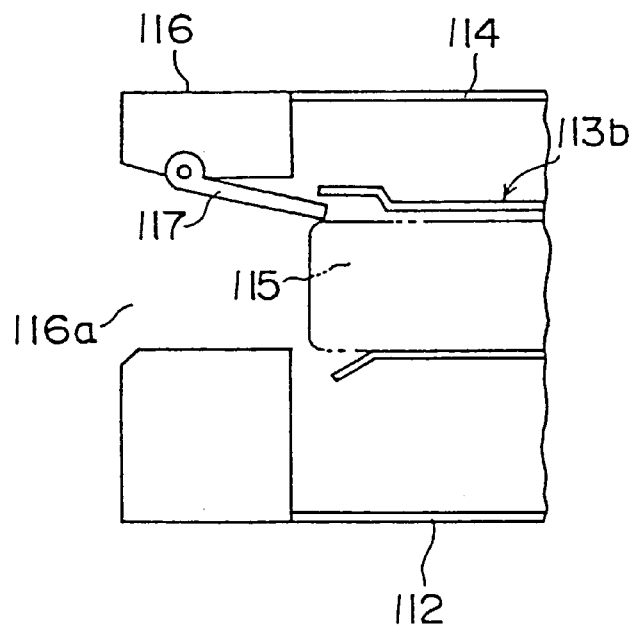
Figure 5A:
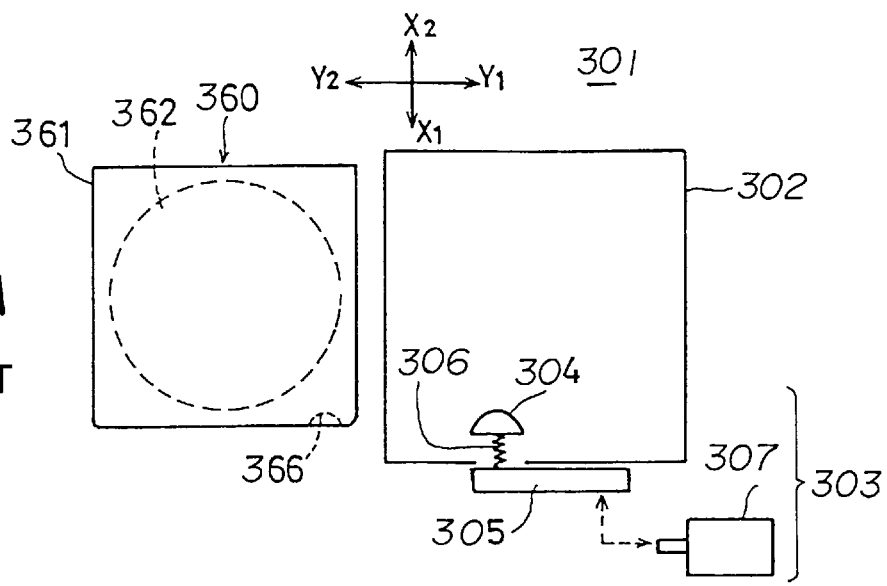
FIGS. 5A, 5B and 5C generally show a structure and operation of a disc device in the related art.
Figure 5B:
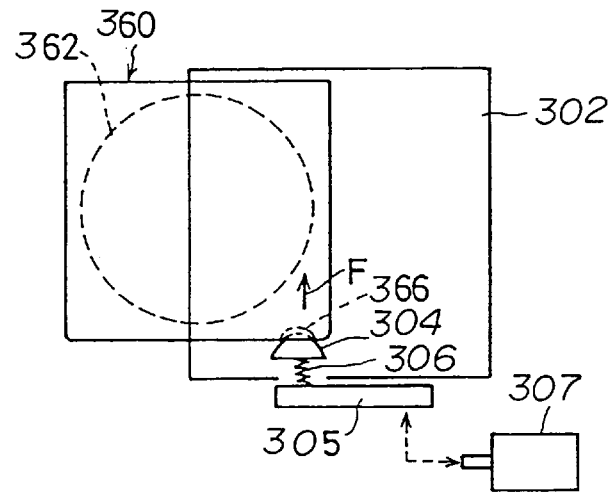
Figure 5C:
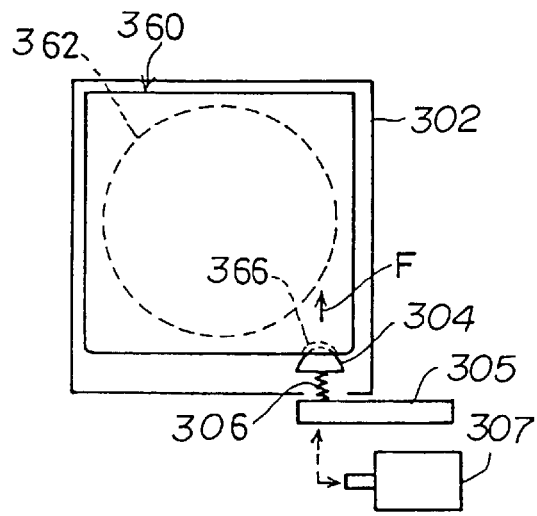

FIGS. 8 and 9 show a lift-type disc (MD) device in the first embodiment of the present invention. Similarly to the device in the related art shown in FIGS. 1 and 2, a collet 2 (rotational driving motor) for rotating a disc contained in a MD disc cartridge MD and a reading head 3 for reading information stored in the disc are incorporated in a device frame 1 of the device. The device frame 1 is used as a base for assembling the device.

A disc holder 4 in which the MD disc cartridge MD may loaded is placed at a center of a top surface of the device frame 1. A pair of lift cam plates 6L, 6R are placed at two sides of the disc holder 4, and can move along an MD disc cartridge loading direction by sliding on a plurality of guiding pins 5 provided on the top surface of the device frame 1. Each of the lift cam plates 6L, 6R has, in a horizontal portion thereof, long holes 6a extending along forward/backward directions, into which holes the plurality of guiding pins 5 are upward planted on the top surface of the device frame 1. Further, rack teeth 8 engaged by a driving gear 7 are formed on an extending portion 6b of the right lift cam plate 6R. The rack tooth 8 are used. for driving the lift cam plates 6R and 6L. The driving gear 7 is provided at a rear part of the device frame 1.

Further, a pair of spring fasteners 1a, 6c are formed on a right-front part of the device frame 1 and the right lift cam plate 6R respectively as a result of appropriately cutting and upward bending them. A force applying spring 9 is fastened by and thus laid between the spring fasteners 1a and 6c. The force applying springs 9 therefore pull the lift cam plate 6R forward (along a $Y_2$ direction) in FIG. 8. The lift cam plates 6L and 6R are linked with each other through a linking lever 11 as will be described later. Thus, in response to the force applying spring 9 pulling the right lift cam plate 6R along the Y direction, the left lift cam plate 6L is pulled along a reverse $Y_1$ direction.

Vertical portions of the lift cam plates 6R and 6L have lift cams 6d formed therein, respectively, which cams guide a plurality of following pins 10. The following pins 10 are projected from each side wall of the disc holder 4 in which the MD disc MD is loaded. As shown in FIG. 8, forward/backward inclining directions of the lift cams 6d are reversed between the left and right lift cam plates 6L and 6R. The reason therefor will be described later.

Movement preventing nails 1b are projected from the device frame 1 as a result of being cut and upward bent, and are engaged with some of the following pins 10. The engagement allows the disc holder 4 to move only along a direction perpendicular to the top surface of the device frame 1.

A rotation center portion 4a is formed to project from a center of the top surface of the disc holder 4, and may be inserted into a center hole 12 formed in a center portion of the linking lever 11. Dropping preventing pins 13 provided from the left and right parts of the top surface of the disc holder 4 are inserted into arc-shaped guiding holes 4b, and thus the linking lever 11 is prevented from dropping from the disc holder 4. Further, the linking lever 11 has linking pins 14 fixed at two ends thereof, and are engaged with linking lobes 6e which are laterally bent from the vertical portions of the lift cam plates 6L and 6R. Therefore, the lift cam plates 6L and 6R may slide along reverse directions in response to the linking lever 11 being rotated.

The above-described structure of the disc (MD) device in the first embodiment allows the following operations: Movement of the disc holder 4 with respect to the device frame 1 can be controlled by rotation of the driving gear 7, the collet 2 and reading head 3 being incorporated in the device frame 1 as mentioned above. Specifically, the driving gear 7 drives the right lift cam plate 6R to slide along the $Y_1$ direction against the elastic force of the force applying spring 9. This movement of the right lift cam plate 6R is transmitted to the left lift cam plate 6L through the linking lever 11. As a result, the left lift cam plate 6L slides along the reverse $Y_2$ direction. As a result, due to the engagements of the following pins 10 with the lift cams 6*d* having the reverse forward/backward inclining directions between the right and left lift cam plates 6R and 6L, the right and left sides of the disc holder 4 are together lowered. Thus, the disc holder 4 is lowered in parallel so that a plane of the holder is parallel to a plane thereof after being lowered. Thus, the disc holder 4 enters the reproducible state show in FIG. 9.

When the thus-loaded MD disc MD is drawn out from the disc (MD) device, the driving gear 7 is reverse rotated, and thus the disc holder 4 is lifted as a result of the lift cam plates 6R and 6L moving reversely to the above-described movement due to the same mechanism. As a result, the MD disc MD is removed from the collet 2 and reading head 3, the MD disc MD being thus freed.

In the structure shown in FIG. 8, no extra member is present between the top surface of the device frame 1 and the disc holder 4. As a result, it is possible to shorten the lift/lower stroke of the disc holder 4, and thus it is possible to shorten the thickness of the disc (MD) device. Thus, the structure is suitable for a portable disc device, in which a miniaturization thereof is required.

Further, each one of the lift cam plates 6L and 6R is independently attached to the device frame 1. As a result, differently from the disc device in the related art shown in FIG. 1, ensuring the total of the lift cam plates 6L and 6R to lie in the same plane is not required. As a result, a high assembling accuracy is not required and thus the yield of the products can be improved.

Figure 10:
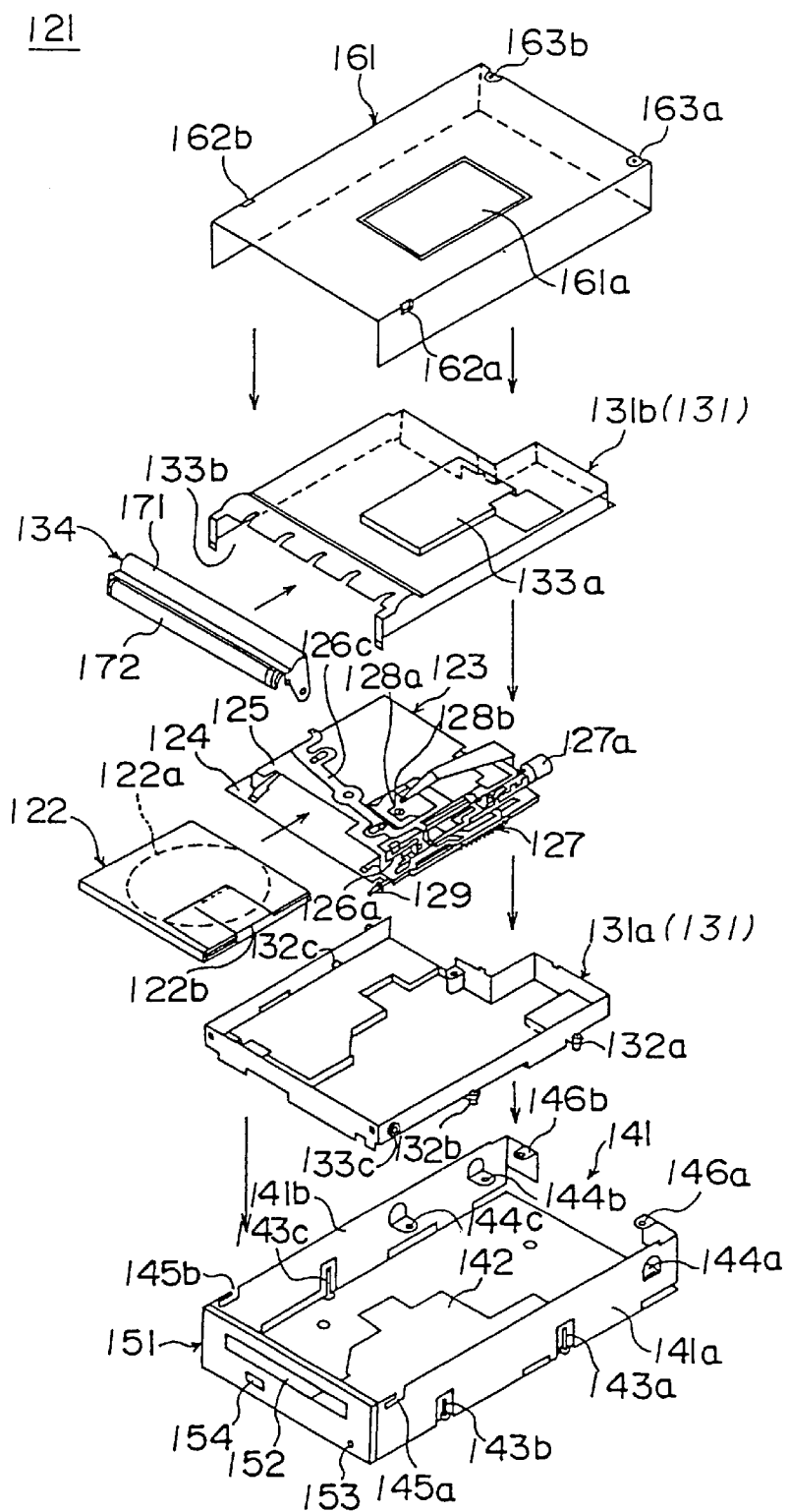
FIG. 10 shows an exploded perspective view of a mini-disc device in a second embodiment of the present invention.

FIG. 10 shows an exploded perspective view of a mini-disc device 121 in a second embodiment of the present invention. In the figure, the mini-disc device 121 is provided with a driving unit 123 for recording information on/reproducing information from a magneto-optical mini-disc (for example, a 2.5-inch disc) 122*a* as a recording medium contained in a cartridge 122.

Generally, the driving unit 123 includes a unit frame 124 on which the following components are provided: a loading mechanism unit 127 including a holder 125 for holding the cartridge 122, sliders 126*a*, 126*b* (not shown in the figure) for lifting/lowering the holder, a loading motor for drawing the cartridge 122 into the holder 125 and causing the sliders 126*a*, 126*b* to slide and so forth. The driving unit 123 further includes a spindle motor (not shown in the figure) for rotating the mini-disc 122*a*, a carriage mechanism unit (not shown in the figure) for moving an optical head 128*a* along a radial direction for performing recording/reproducing operations, a magnetic head 128*b* for performing a recording operation, and so forth.

Each of the sliders 126*a*, 126*b* moves along a direction reverse of each other and thus lifts/lowers the holder 125. For ensuring the lifting/lowering movements, a link 126*c* rotates about a center portion thereof at which portion the link is supported. Further, a manual eject lever 129 is provided for manually ejecting the cartridge when the loading motor 127*a* has trouble.

In this driving unit 123, when the cartridge 122 is inserted into the holder 125, the loading mechanism unit 127 further draws the cartridge 122. At this time, a cartridge shutter 122*b* of the cartridge 122 is opened and thus a part of the mini-disc 122*a* extending along a radial direction thereof is bared. In this case, the optical head 128*a* is positioned below the bared part of the mini-disc 122*a* and the magnetic disc 128*b* is positioned above the bared part.

The driving unit 123 is covered by an internal cover unit 131 as a first cover consisting of a lower internal cover 131*a* and an upper internal cover 131*b*. The lower internal cover 131*a* has a shape such as to contain the driving unit 123, and has appropriate steps so as to contain the above-mentioned components of the driving unit 123, and a enclosure frame and an eject switch which will be described later. Further, shock absorbing members. 132*a* through 132*c* formed as a result of resilient members such as rubber being pipe-shaped are provided at predetermined positions of an outer side wall of the lower internal cover 131*a*.

The upper internal cover 131*b* has a shape matching the lower internal cover 131*a* so as to form an internal space. The upper internal cover 131*b* has a step projection 133*a* for providing a space required for the magnetic head 128*b* (and a supporting arm thereof) to be lifted/lowered. Further, opening portions are formed where the upper internal cover 131*b* comes into contact with the lower internal cover 131*a*. The opening portions are used for baring an electric connector of the driving unit 123 and drawing electric wires.

Further, an opening portion 133*b* is formed at a front of the upper internal cover 131*b* through which the cartridge 122 is loaded/ejected. A shutter mechanism unit 134 acting as shutter means is fitted to fitting portions 133*c* provided at two sides of the lower internal cover 131*a* so as to be positioned in the opening portion 133*b* (which will be described later with reference to FIG. 14).

Figure 11:
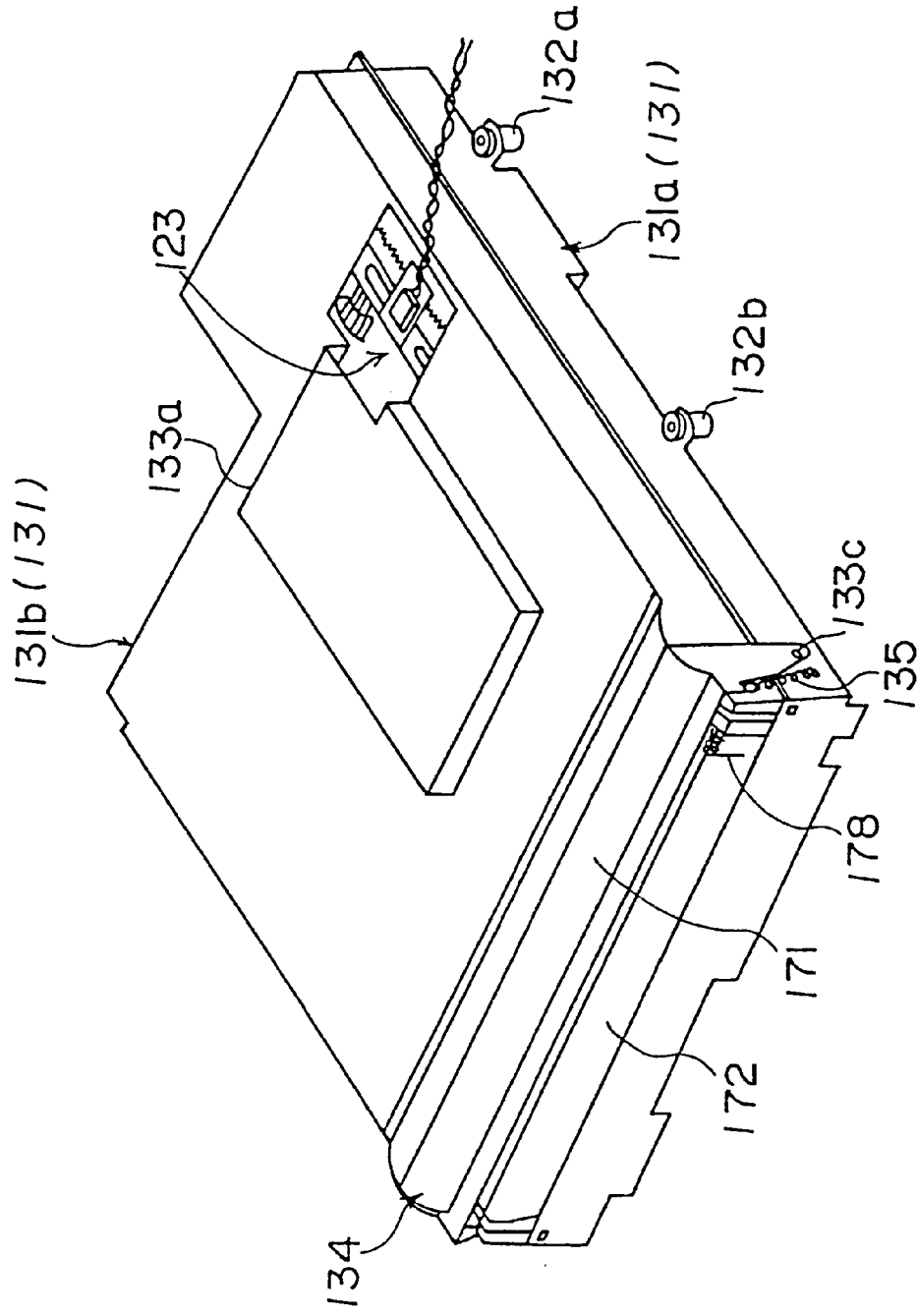
FIG. 11 shows an outer perspective view of an inner cover unit in the mini-disc device shown in FIG. 10.
Figure 12:
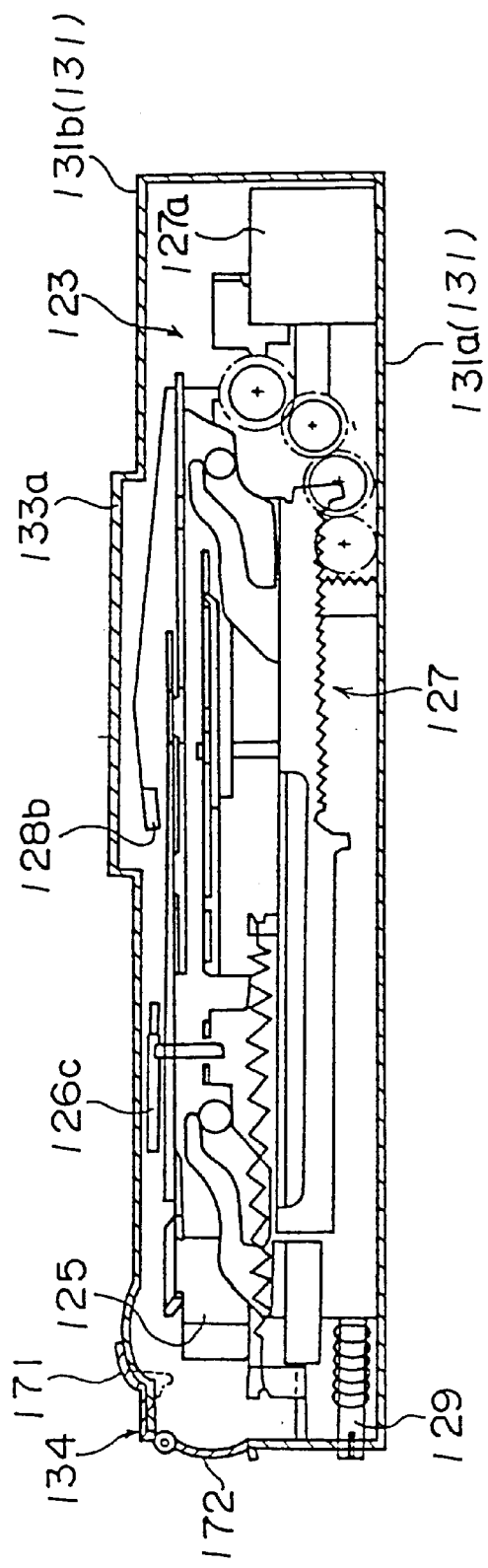
FIG. 12 shows a side elevational sectional view of the inner cover unit and internal components thereof shown in FIG. 11.

FIG. 11 shows an external view of the internal cover shown in FIG. 10, and FIG. 12 shows a side elevational sectional view of the internal cover shown in FIG. 11 and components inside the cover. As shown in the figures, the lower internal cover 131*a* and upper internal cover 131*b* come into contact with each other so as to contain the driving unit 123. As a result of assembling the two internal covers 131*a* and 131*b* as mentioned above, openings present on the assembly are only the opening portions provided for drawing out the connector and wires of the driving unit 123 as mentioned above.

In the opening portion 133*b* of the upper internal cover 131*b* is located the shutter mechanism unit 134 fitted to the fitting portions 133*c* of the lower internal cover 131*a*. A downward force is applied to the shutter mechanism unit 134 by a spring 135 shown in FIG. 11. Thus, a position of a shutter (which will be described later) of the shutter mechanism unit 134 is coincident with a portion of the holder 125 in the driving unit 123, through which portion the cartridge 122 is inserted.

With reference to FIG. 10 again, an enclosure frame 141 for containing the internal cover unit 131 containing the driving unit 123 has an opening portion 142 matching a stepped shape of the internal cover unit 131. Further, the enclosure frame 141 is provided with pins 143*a* through 143*c* standing at positions relevant to the above-mentioned shock absorbing members 132*a* through 132*c*.

On side plates 141*a*, 141*b* of the enclosure frame 141, mounting portions 144*a* through 144*c* are formed as a result of being cut and bent for mounting the internal cover unit 131 and other components such as, for example, control circuit substrate for controlling recording/reproducing operations, a power source substrate and so forth. The control circuit substrate is a substrate on which electronic components such as, for example, a microprocessor unit (MPU), a digital signal processor (DSP), a read/write control circuit, a driver for each motor and so forth are mounted. Further on the side plates 141*a*, 141*b*, engaging portions 145*a*, 145*b* for being engaged with an enclosure cover 161 (which will be described later) are formed. Fitting portions 146*a*, 146*b* are formed at portions resulting from inside bending of backward extending portions of the side plates 141a, 141b. The fitting portions 146a, 146b are used for fixing through screws or like fitting portions 163a, 163b of the enclosure cover 161.

A front bezel 151 as a front portion is fitted at a front surface of the enclosure frame 141. In the front bezel 151, an inserting hole 152 for inserting the cartridge 122 is formed, and a hole for baring the manual eject lever 129 is formed. Further, an eject button 154 for automatically ejecting the cartridge 122 using the motor 127a is provided there. The eject button 154 is used for operating the eject switch (not shown in the figure) and thus driving the motor 127a. It is also possible to provide the eject switch itself on the front bezel 151.

When the internal cover unit 131 containing the driving unit 123 is contained into the enclosure frame 141, the pins 143a through 143c provided in the enclosure frame 141 are fitted into the shock absorbing members 132a through 132c provided on the internal cover unit 131. Thus, the shock absorbing members 132a through 132c are inserted between the enclosure frame 141 and the internal cover unit 131. As a result, externally applied mechanical shock is absorbed by the shock absorbing members and, thus the driving unit 123 is prevented from being adversely affected thereby. Further, an error rate in the device can be improved and data can be secured. Further, positioning of the internal cover unit 131 in the enclosure frame 141 becomes easier and thus assembling thereof becomes easier.

The enclosure cover 161 is used for covering three sides, other than a side of the front bezel 151, of the enclosure frame 141. The enclosure cover 161 has engaging portions 162a, 162b formed thereon relevant to the engaging portions 145a, 145b of the enclosure frame 141. Further, the enclosure cover 161 has the fitting portions 163a, 163b relevant to the fitting portions 146a, 146b of the enclosure frame 141. Further, an opening portion 161a is formed at a position corresponding to the step projection 133a of the upper internal cover 131b.

The enclosure cover 161 is fitted to the enclosure frame 141 containing the internal cover 131 as the engaging portions 145a, 145b, 162a, 162b are engaged with one another and the fitting portions are fixed to one another through screws or the like.

Figure 13:
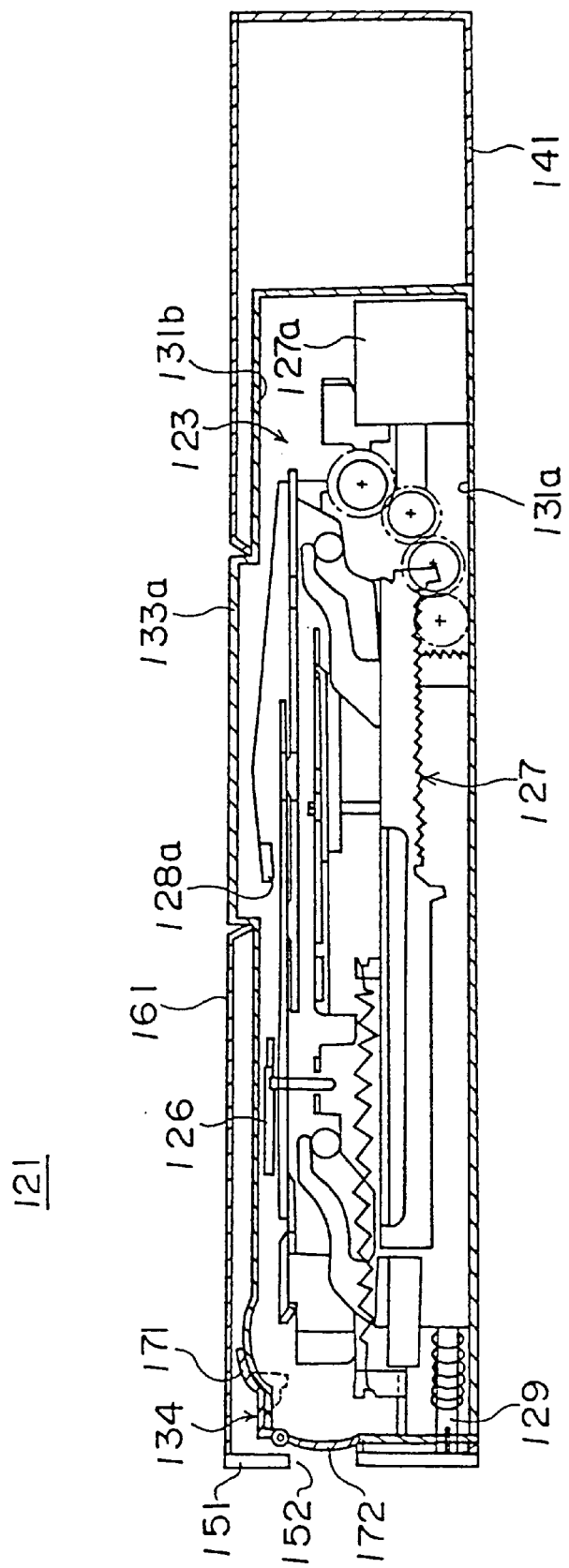
FIG. 13 shows a side elevational sectional view of the mini-disc shown in FIG. 10.

FIG. 13 shows an elevational sectional view of the mini-disc device in the second embodiment. As shown in the figure, the driving unit 123 is contained in the enclosure frame 141 and enclosure cover 161 in a state in which the driving unit 123 is covered by the internal cover unit 131. When the cartridge 122 is inserted through the inserting hole 152, the shutter 172 of the shutter mechanism unit 134 is pressed and thus enters an opened state. Then, the cartridge 122 is drawn by the loading mechanism 127 of the driving unit 123 and thus is loaded in the holder 125.

Thus, the driving unit 123 is covered by the internal cover unit 131, and thus there are no openings other than the above-mentioned necessary opening portions, and thus an entrance of dirt/dust in the driving unit 123 is prevented. As a result, adhering dirt/dust to the mini-disc 122a or optical head 128a can be prevented. Thus, the error rate in reproduction operations and data security can be improved.

FIGS. 14A and 14B show a structure of the shutter mechanism unit 134 shown in FIG. 11. FIG. 14A shows a side elevational view and FIG. 14B shows a plan view viewed along an A-arrow direction shown in FIG. 14A. As shown in the figures, the shutter mechanism unit 134 consists of a shutter holder 141 and the shutter 172 acting as a lid portion.

In the shutter holder 171, a top plate 173 has a length longer than a width of the cartridge 122 and has an arc-shaped cross section. As shown in FIG. 10, the cartridge 122 is inserted into the mini-disc device 21 in an insertion state in which the shutter 122b is located at the side of the cartridge 122 along the insertion direction. The length of the top plate 173 should be longer than an insertion width of the cartridge 122 which is a width thereof perpendicular to the inserting direction in the above-mentioned insertion state. At two sides of the top plate 173, fan-shaped rotation supporting plates 174a, 174b are formed. On the rear surface of the top plate 173, a predetermined number (three pieces in this example as shown in FIG. 14B) of projections 175a through 175c acting as contacting portions are formed. Each of the projections 175a through 175c is taper-shaped on the shutter 72 side thereof. In the rotation supporting plates 174a, 174b, holes $174a_1$, $174b_1$ are formed so as to be rotatably fitted by the fitting portions 133c of the lower internal cover 131a.

On the top plate 173, shutter supporting plates 176a, 176b are formed, inside the space between the rotation supporting plates 174a, 174b, with an interval therebetween wider than the above-mentioned insertion width of the cartridge 122. The shutter supporting plates 176a, 176b have supporting point pins 177a, 177b formed thereon, respectively. The shutter 172 is rotatably fitted to the supporting point pins 177a, 177b. At this time, a spring 178 is fitted to the pin 177a so that two ends of the spring 178 are engaged with the shutter 172 and the shutter supporting plate 176. Thus, the spring 178 applies a force to the shutter 172 such as to always close the shutter 172.

FIG. 15 shows a magnified elevational sectional view of a portion at which the shutter mechanism unit shown in FIG. 14 is fitted to the internal cover unit. In the figure, as mentioned above, the holes $174a_1$, $174b_1$ of the rotation supporting plates 174a, 174b are rotatably fitted by the fitting portions 133c of the lower internal cover 131a. Further, the spring 135 is laid between the rotation supporting plate 174a and the lower internal cover 131a.

As a result, the spring 135 applies a force to cause the shutter mechanism unit 134 to move toward the opening portion 133b of the lower internal cover 131b, and also the spring 178 applies a force to cause the shutter 172 to move so as to close the opening portion 133b. As a result, the opening portion 133b of the internal cover unit 131 is in a closed state and thus dirt/dust is prevented from entering through the opening portion 133b.

Figure 16A:
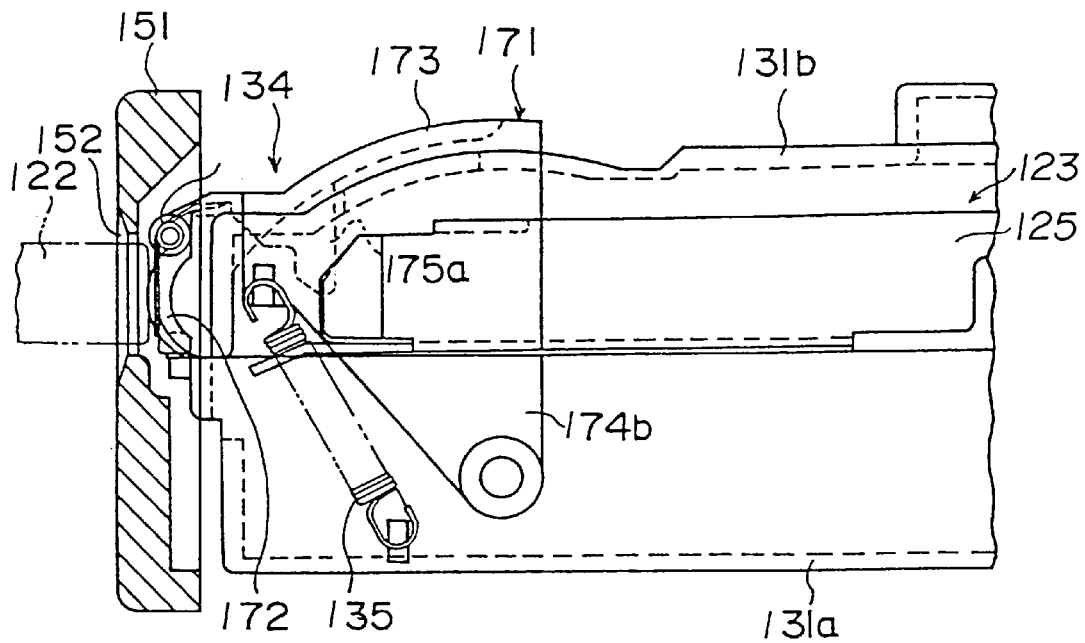
FIGS. 16A, 16B, 17A and 17B illustrate an operation of the shutter mechanism unit shown in FIG. 15.

With reference to FIGS. 16A, 16B, 17A and 17B, an operation of the shutter mechanism unit shown in FIG. 15 will now be described. FIG. 16A shows a state before the cartridge 122 is inserted, in which state, due to the two springs 135, 178, the shutter 172 closes the opening portion 133b of the internal cover unit 131.

Figure 16B:
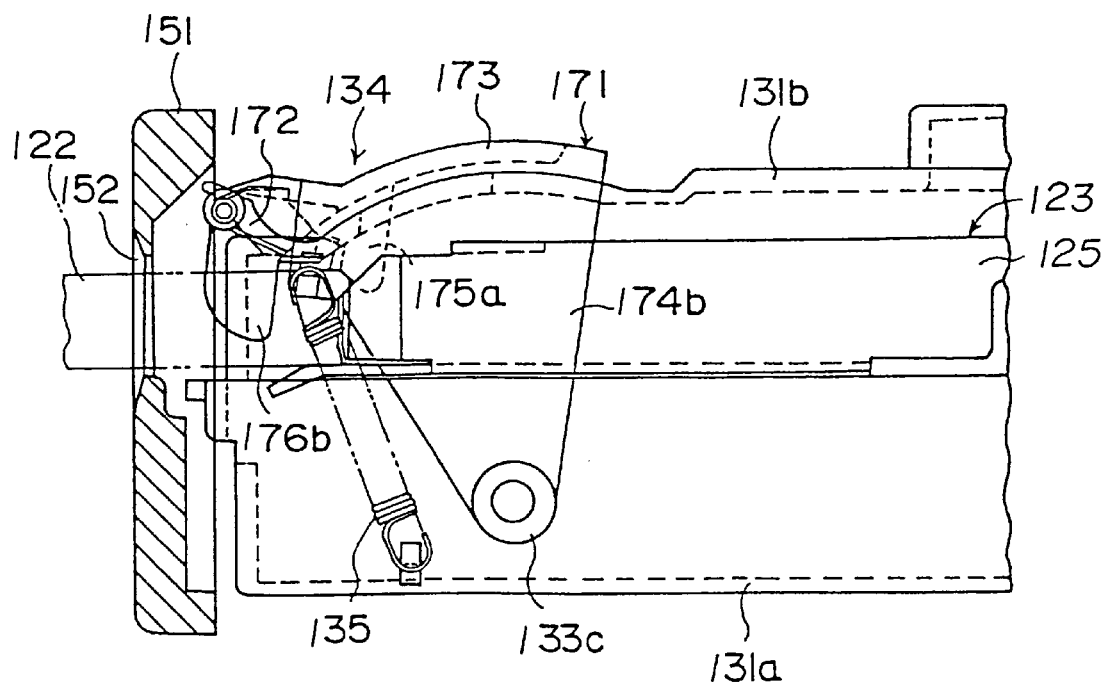

When, as shown in FIG. 16B, the cartridge 122 is inserted through the inserting hole 152 of the front bezel 151, the advancing end of the cartridge 122 presses the shutter 172 inward (rightward in FIG. 16B) and thus rotates the shutter 172 inward. When the insertion of the cartridge 122 is continued, a state in which the shutter 172 is in contact with the top surface of the cartridge 122 is continued. As a result, the advancing end of the cartridge 122 comes into contact with the projections 175a through 175c.

Figure 17A:
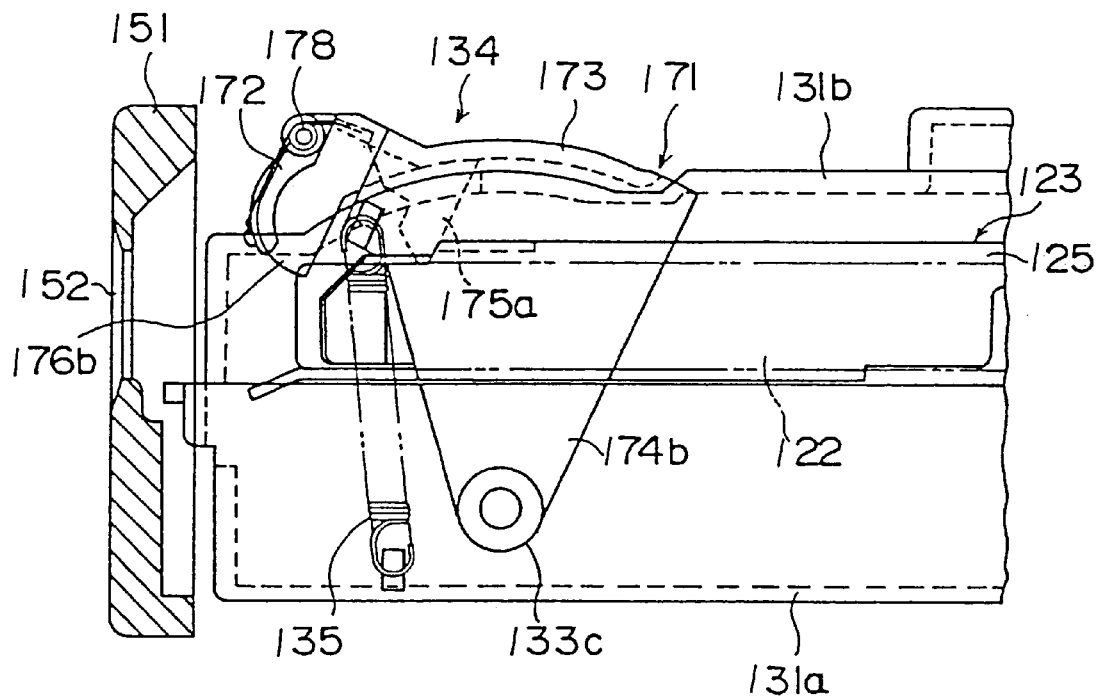

When the cartridge 122 is further pressed in after the advancing end thereof has come into contact with the projections 175a through 175c, as the tapered surfaces of the projections 175a through 175c slide on the cartridge 122, the shutter holder 171 is rotated clockwise in FIG. 16B about the fitting portions 133c. When the rotation of the shutter holder 171 is finished, as shown in FIG. 17A, the projecting ends of the projections 175a through 175c come into contact with the top surface of the cartridge 122. Further, the extending end of the shutter 172 is removed from the top surface of the cartridge 122 and thus, due to the spring 178, the shutter 172 is rotated clockwise. Thus, the state of the shutter 172 is returned to the state before the cartridge 122 was inserted.

Figure 17B:
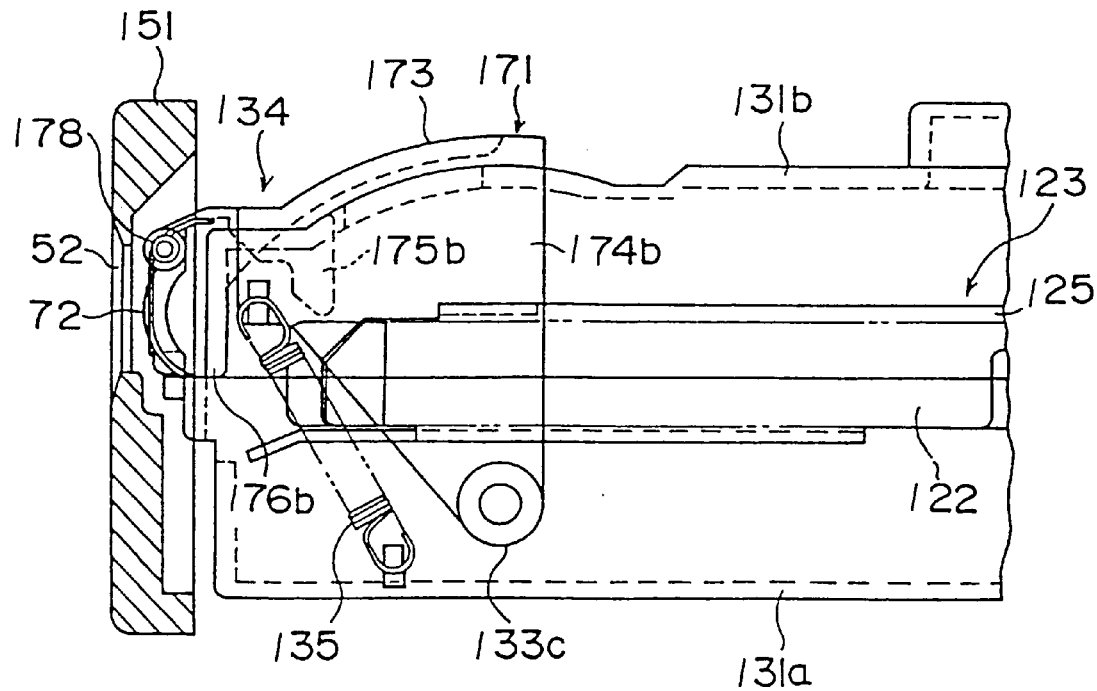

When a certain length of the cartridge 122 has been inserted into the holder 125 of the driving unit 123, the motor 127a of the loading mechanism 127 is operated and thus the cartridge is further drawn into the holder 125. FIG. 17B shows a state in which the cartridge 122 has been loaded into the holder 125 to the final position (at which the metal hub at the center of the mini-disc 122a in the cartridge 122 is positioned at a position coincident with the position of the spindle shaft of the spindle motor.).

As shown in FIG. 17B, the holder 125 is lowered a predetermined amount, as a result of the sliders 126a, 126b shown in FIG. 10 in the driving unit 123 sliding. As a result of the holder 125 being lowered, the projecting ends of the projections 175a through 175c of the shutter mechanism unit 134 are removed from the top surface of the cartridge 122. As a result, due to an elastic restoration force of the spring 135, the shutter holder 171 is returned to the original state shown in FIG. 16A. As a result of the holder 125 being lowered, the metal hub at the center of the mini-disc 122a is magnetically attracted by the spindle shaft having a magnetic force and thus is held by the spindle shaft. In this state, the mini-disc 122a may be rotated as a result of the spindle motor being rotated.

Thus, when the cartridge 122 is completely loaded in the holder 125, the shutter 172 closes the inserting hole 152 of the front bezel 151, and thus the opening portion 133b of the internal cover unit 131 is closed. Thus, even after the cartridge 122 has been loaded, the opening portion 133b is in the closed state and thus no dirt/dust can enter therethrough.

When the cartridge 122 is taken out from the disc device, in response to an ejecting operation being performed either as the eject button 154 of the front bezel 151 is pressed causing the motor 127a of the loading mechanism 127 to reversely rotate, or as the manual eject lever 129 is rotated, the holder 125 holding the cartridge 122 is lifted.

As a result of the holder 125 being lifted, from the state shown in FIG. 17B, the rear end (the left end in FIG. 17B) of the cartridge 122 comes into contact with the projecting ends of the projections 175a through 175c of the shutter mechanism unit 134. When the holder 125 is further lifted, the shutter holder 171 is rotated about the fitting portions 133c clockwise in the figure. Thus, the shutter mechanism unit 134 enters the state shown in FIG. 17A. In this state, the loading mechanism 127 performs an unloading operation, and thus causes the cartridge 122 to project leftward in FIG. 17A through the inserting hole 152 of the front bezel 151. When the cartridge 122 is then drawn out, the shutter holder 171 of the shutter mechanism unit 134 is returned to the original state due to the spring 135. Thus, the shutter mechanism unit 134 enters the state shown in FIG. 16A.

Thus, not only when the cartridge 122 is not loaded in the disc device but also after the cartridge 122 has been loaded, the shutter 172 in the shutter mechanism unit 134 closes the opening portion 133b of the internal cover unit 131. As a result, an entrance of the dirt/dust is prevented and thus the error rate in the reproduction operations is improved and data security is improved.

Thus, according to the present invention, the driving unit is appropriately covered by a cover unit, such as the inner cover unit 131, in the enclosure frame. As a result, dirt/dust is prevented from entering the driving unit in which information recording/reproducing operations are performed on the disc recording medium such as the magneto-optical disc. Thus, an error rate is improved and thus data security is improved.

In the above-described embodiment, the shutter 172 in the shutter mechanism unit provided in the inner cover unit 131 is closed when the cartridge 122 has been loaded in the mini-disc device. However, it is also possible to provide the shutter rotatably supported to the upper inner cover 131b via a spring. In such a structure, a state in which the shutter is in contact with the top surface of the cartridge 122 is continued even after the cartridge has been loaded.

Further, in the second embodiment shown in the figures, shutter means such as the shutter 172 is provided in the cover unit at a position through which the cartridge is inserted. Therefore, the shutter means further improves the dirt/dust entrance preventing function of the cover unit. Thus, further data security improvement can be achieved.

Further, in the second embodiment, resilient members such as the shock absorbing members 132a through 132c are provided between the cover unit and the enclosure frame. Thus, mechanical shock externally applied to the enclosure frame can be effectively absorbed and thus, an error rate is improved and thus data security is improved.

Further, in the second embodiment shown in the figures, a rotational body is provided, such as the shutter mechanism unit 134, having a lid portion such as the shutter 172 at the cartridge inserting portion and contacting portions such as the projections 175a through 175c. In such a structure, the cartridge comes into contact with the contacting portions and thus rotates the rotational body. Then, after the loading of the cartridge is finished, the cartridge is removed from the contacting portions and thus the rotational portion is returned. At this time, the lid portion closes the cartridge inserting portion. As a result, an entrance of the dirt/dust is prevented and thus the error rate in the reproduction operations is improved and data security is improved.

Further, in the second embodiment, the rotational body such as the shutter mechanism unit 134 is provided in the cover unit such as the internal cover unit 131 at a portion corresponding to the cartridge inserting portion. As a result, entrance of the dirt/dust is further prevented and thus the error rate in the reproduction operations is further improved and data security is further improved.

Further, as a variant of the second embodiment of the present invention, a mini-disc device may only include the driving unit 123, the internal cover unit 131 and the shutter mechanism 134.

Further, as another variant of the second embodiment according to the present invention, the internal cover unit 131 may not be provided. In such a case, the shutter mechanism unit 134 is fitted to a fitting portion formed on the rear surface of the front bezel 151, and the shutter 172 is located at the inserting hole 152. As a result, the shutter mechanism unit 134 can performs a similar function.

Further, application of the present invention is not limited to the mini-disc device 121, and the present invention applied to the second embodiment can also be similarly applied to any disk devices, using disc recording media, such as floppy disk devices, other magnetic disk devices, compact disc devices, other optical disc devices, and laser disc devices.

FIGS. 19, 20, 21, 22 and 23 show a mini-disc device 310 in a third embodiment of the present invention. In the mini-disc device 30, a device body 311 is incorporated in a box 312. The box 312 has a front bezel 313. The front bezel 313 has a mini-disc cartridge inserting hole 314 and an eject button 316. The device body 311 has a chassis 320, a cartridge holder 321, a lift/lower cam plate 322, a drawing/ pressing rack plate 323, a hook-lever supporting plate 324, a hook lever 325, a loading motor 326, a disc motor 327, an optical head 328, an auxiliary field coil 329, a gear mechanism 30 and so forth.

Figure 23:
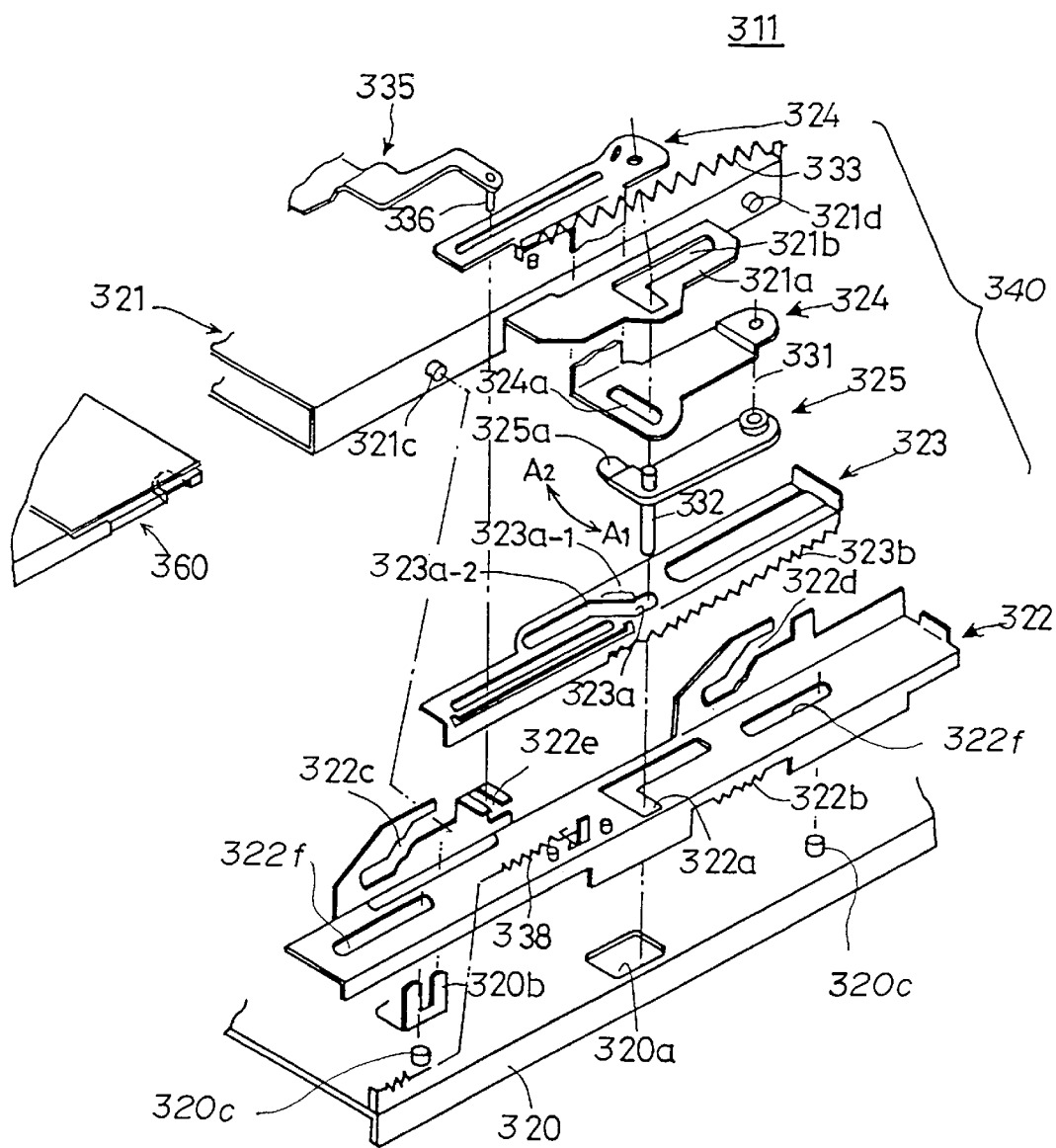
FIG. 23 shows an exploded perspective view of a disc loading mechanism part in the disc device in the third embodiment.

Cartridge automatic loading means includes the above-mentioned holder 321, plates 322, 323, 324, lever 325, loading motor 326, and gear mechanism 230. Recording/ reproducing means includes the optical head 328, auxiliary field coil 329, and disc motor 327. As shown in FIG. 23, the lift/lower cam plate 322 is along-$Y_1$-and-$Y_2$-directions slidably provided on the chassis 320. The drawing/pressing rack plate 323 is along $Y_1$ and $Y_2$ directions slidably provided on the lift/lower cam plate 322. The hook-lever supporting plate 324 is along $Y_1$ and $Y_2$ directions slidably provided on the cartridge holder 321.

Figure 18A:
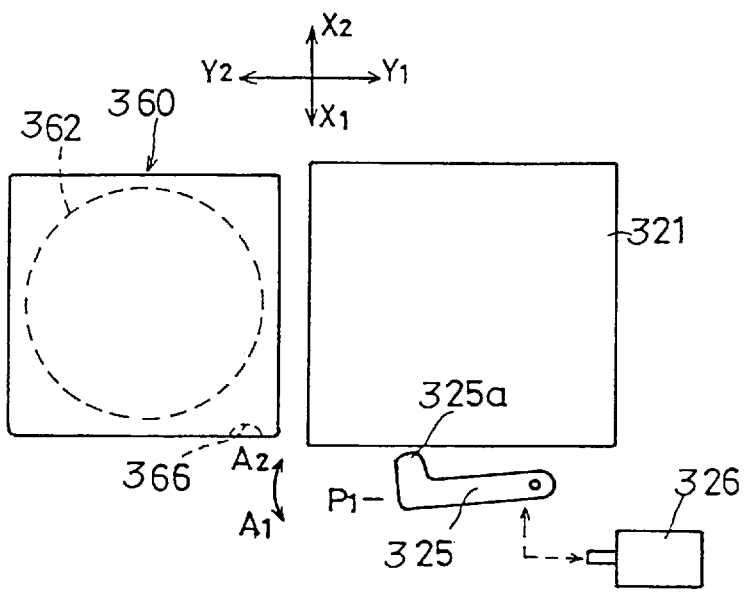
FIGS. 18A, 18B and 18C illustrate a general structure and general operation of a disc device in a third embodiment of the present invention.
Figure 18B:
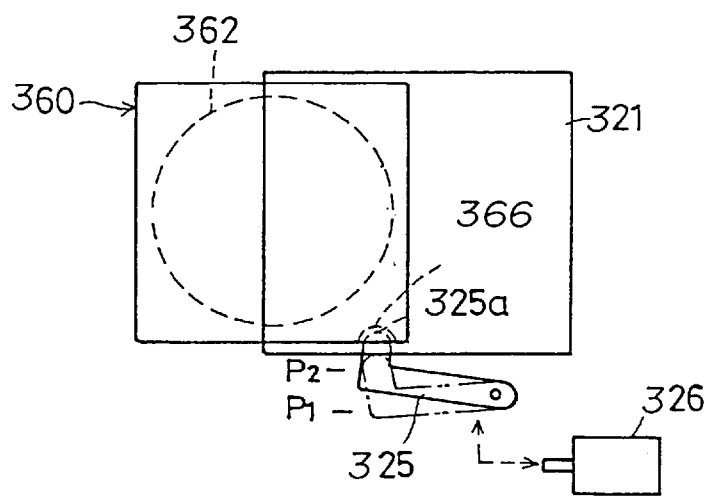
Figure 18C:
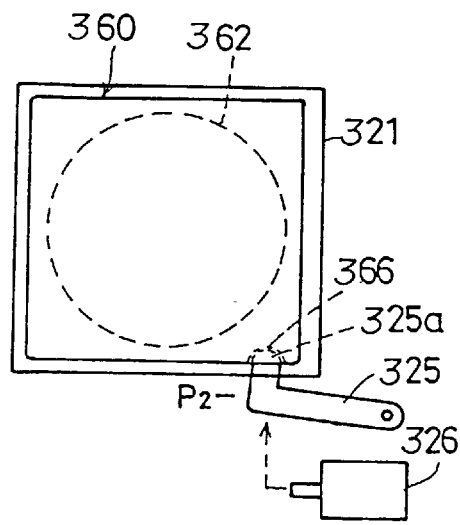

The hook lever 325 rotates along $A_1$ and $A_2$ directions, rotatably supported on the bottom-surface side of the hook-lever supporting plate 324 about a rotational axis 331. The hook lever 325 acts as an engaging member and can rotate between a disengagement position $P_1$ and an engagement position $P_2$ shown in FIGS. 18A, 18B and 18C. A hook 325a of the hook lever 325 shown in FIG. 23 moves along an $X_1$ direction when the hook lever 325 rotates along the $A_1$ direction. The hook 325a moves along an $X_2$ direction when the hook lever 325 rotates along the $A_2$ direction. When the hook lever 325 is located at the disengagement position $P_1$ as a result of rotating along the $A_1$ direction, as shown in FIG. 18A, the hook 325a is out of the holder 321. When the hook lever 325 is located at the engagement position $P_2$ as a result of rotating along the $A_2$ direction, as shown in FIG. 18C, the hook 325a projects in the holder 321.

As shown in FIG. 23, a pin 332 pierces an end of the hook lever 325. A part of the pin 332 upward projecting from the hook lever 325 is fitted into a long hole 324a extending along the $X_1$ and $X_2$ directions in the bottom part of the supporting plate 324 and also into an L-shaped hole 321b formed in a overhanging portion 321a of the holder 321. A part of the pin 332 downward projecting from the hook lever 325 is fitted into a stretched-crank-shaped hole 323a formed in the rack plate 323, into an L-shaped hole 322a of the cam plate 322 and also into a hole 320a formed in the chassis 320.

An inclined part $323a_{-1}$ in the hole 323a functions to rotate the hook lever 325. A corner part $232a_{-2}$ in the hole 323a has a function in a pressing operation which will be described later. As shown in FIG. 23, the top part of the supporting plate 324 is pulled by a pulling coil spring 333 along the $Y_1$ direction. An elastic force applied by the coil spring 333 is stronger than a force required for drawing a cartridge 360, which force will be mentioned later. The rack plate 323 has a rack 323b, and the cam plate 322 has a rack 322b. The cam plate 322 has a pair of inclined cam cut-outs 322c and 322d, and also has a fork portion 322e. A projection 321c provided on a side wall of the holder 321 is fitted into the above-mentioned inclined cam cut-out 322c, and also into a fork portion 320b provided on the chassis 320. Another projection 321d provided on the side wall of the holder 321 is fitted into the inclined cam cut-out 322d.

Figure 20:
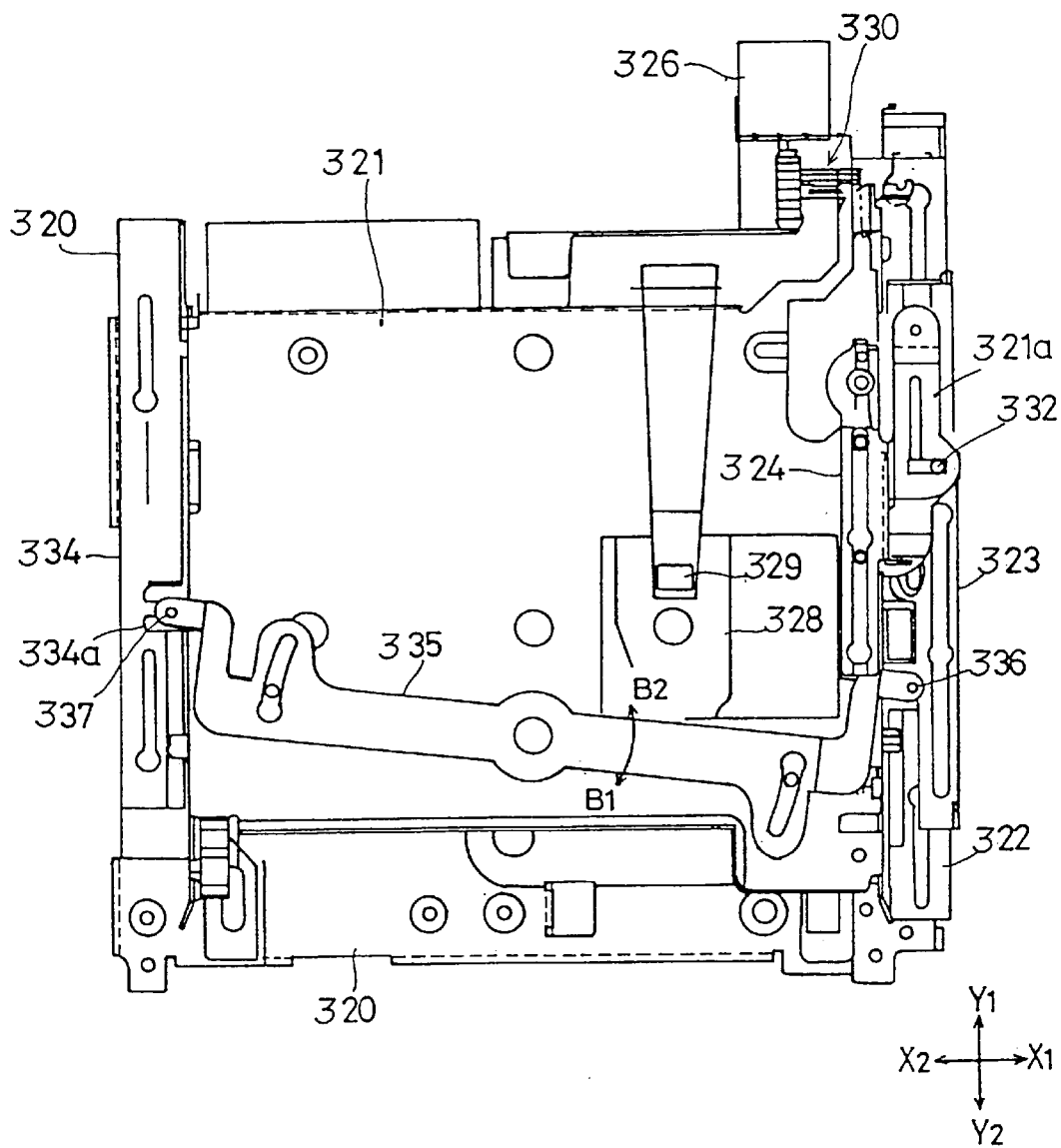
FIG. 20 shows an internal plan view of the disc device in the third embodiment.
Figure 21:
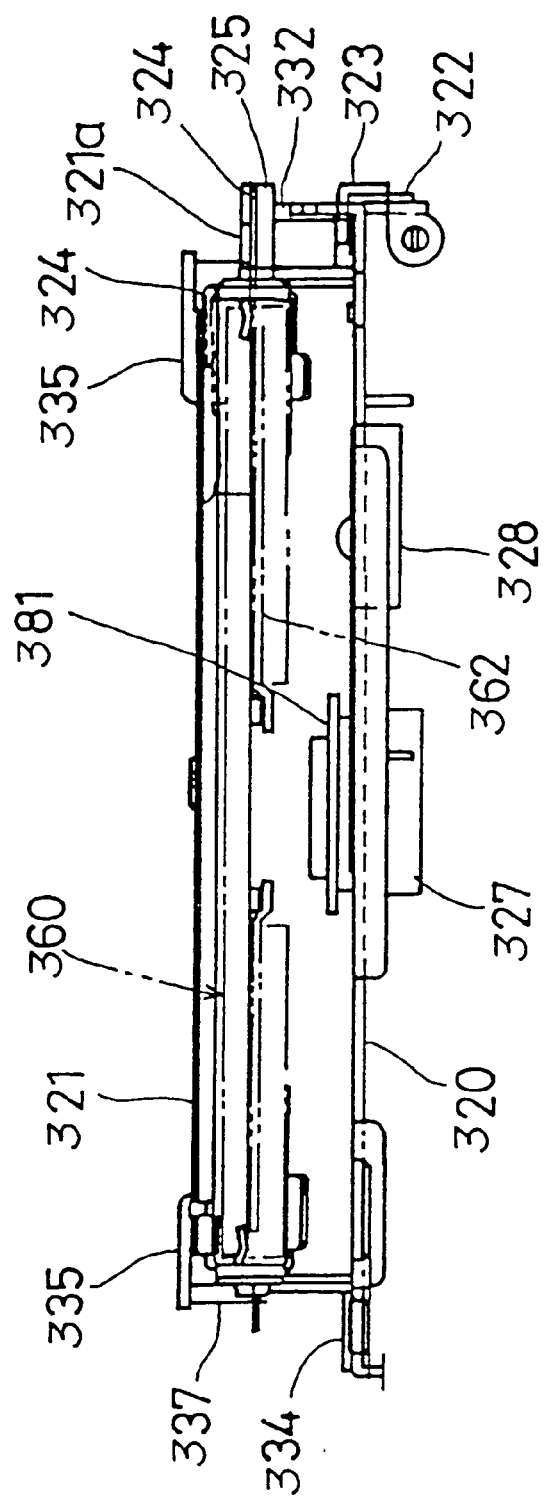
FIG. 21 shows an internal front view of the disc device in the third embodiment.
Figure 22:
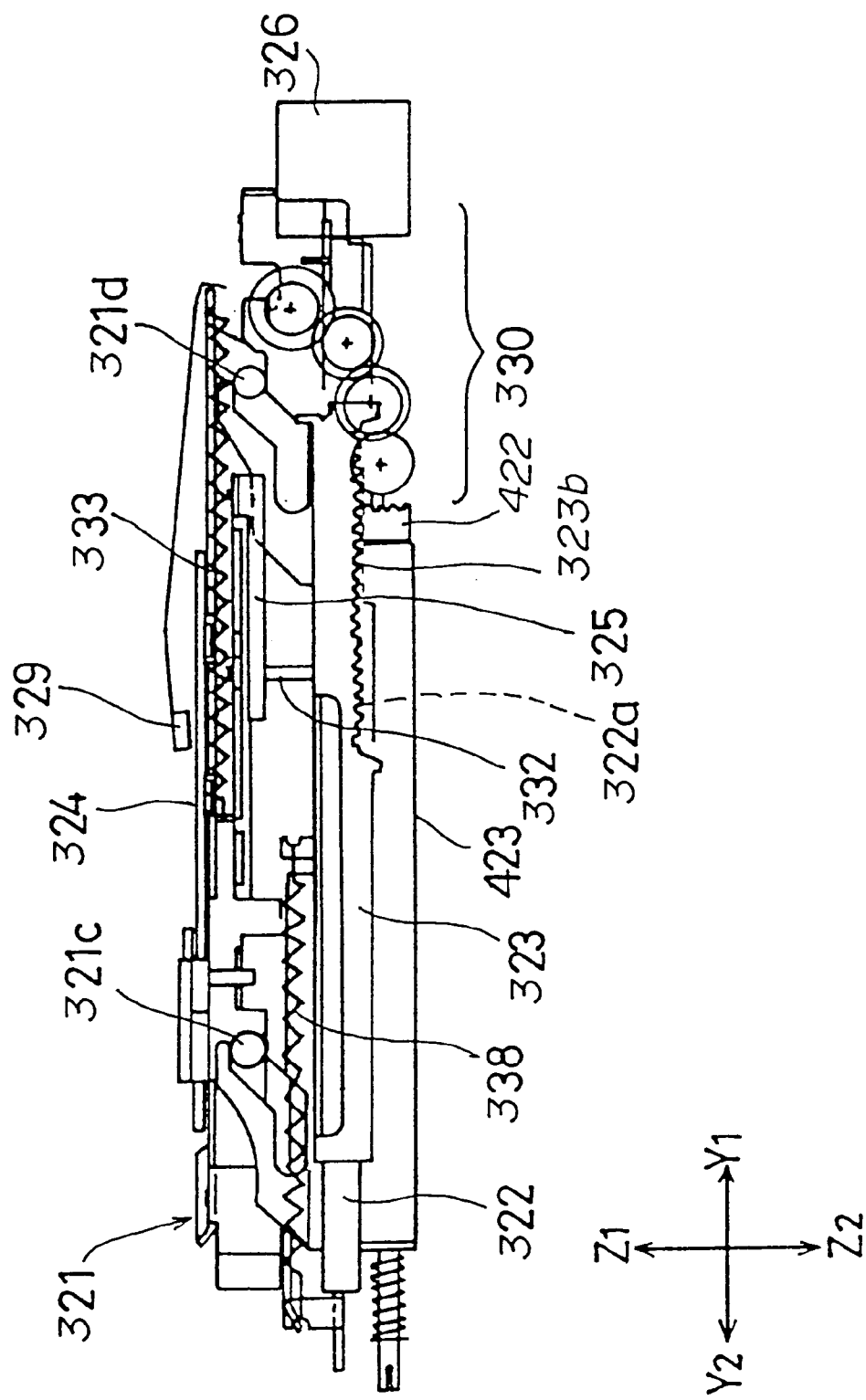
FIG. 22 shows an internal side elevational view of the disc device in the third embodiment.

As shown in FIG. 20, another lift/lower cam plate 334 is provided at the left end side of the chassis 320. A link 335 is along $B_1$ and $B_2$ directions rotatably provided on a top plate of the holder 321. A pin 336 provided at an end of the link 335 is fitted into the fork portion 322e of the cam plate 322, as shown in FIG. 23. A pin 337 provided at the other end of the link 335 is fitted into a fork portion 334a of the cam plate 334, as shown in FIG. 20. As shown in FIG. 23, a pulling coil spring 338 pulls the cam plate 322 along the $Y_2$ direction.

As shown in FIG. 23, a hook-lever moving mechanism 340 includes the pin 332, hole 323a, rack plate 323, supporting plate 324, loading motor 326 and gear mechanism 330. In the hook-lever moving mechanism 340, generally the pin 332 and the inclined part $323a_{-1}$ of the hole 323a act to perform an engagement operation and a disengagement operation which will be described later. Further, the rack plate 323 and supporting plate 234 act to perform a drawing operation and a pressing operation which will be described above. The cam plate 322 acts to perform a lowering operation and a lifting operation which will be described later.

Figure 19:
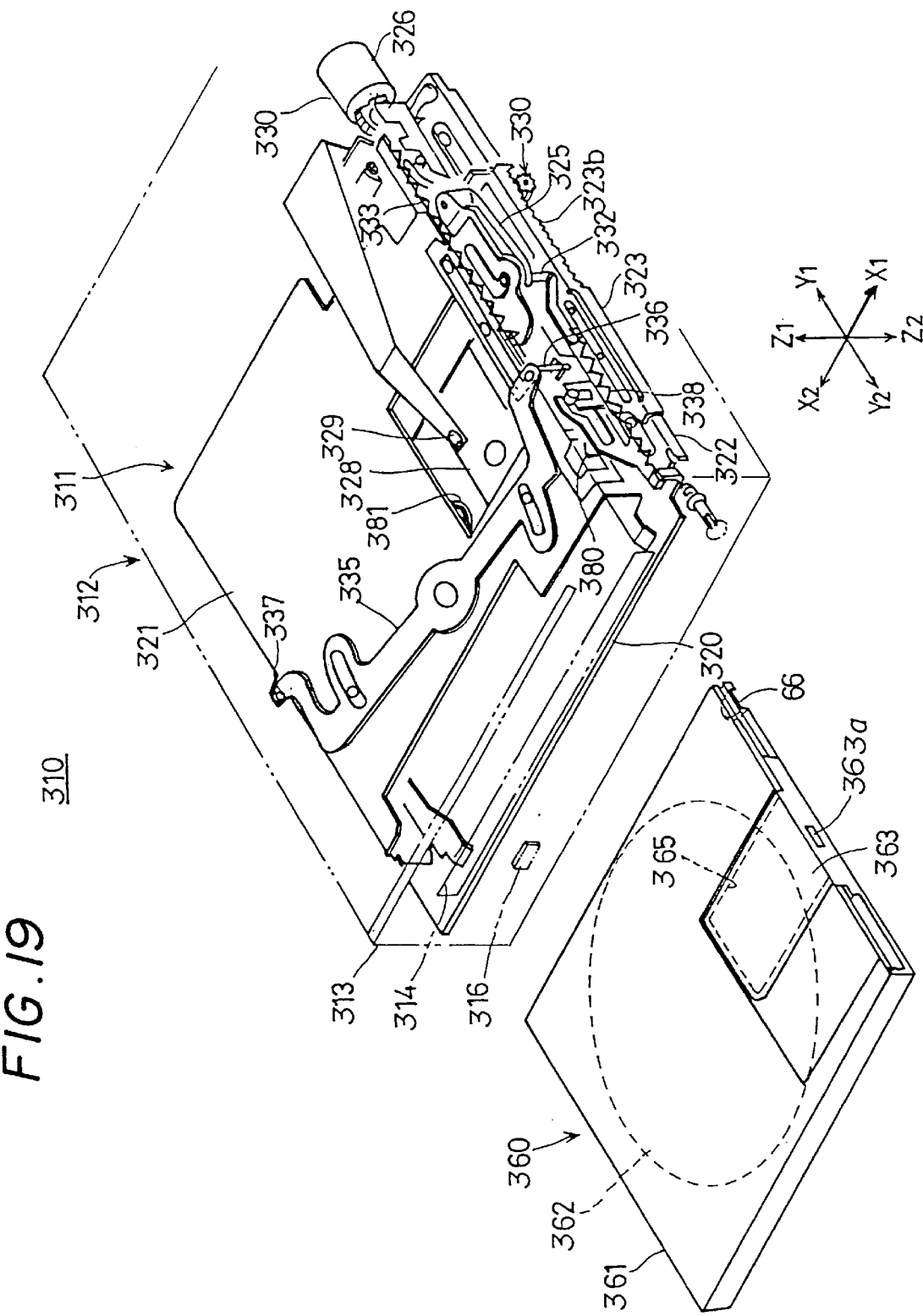
FIG. 19 shows an internal perspective view of the disc device in the third embodiment.

As shown in FIG. 19, in the mini-disc cartridge 360, a magneto-optical disc 362 is contained in a cartridge body 361, and a shutter 363 is fitted to the cartridge body 361.

Figure 24:
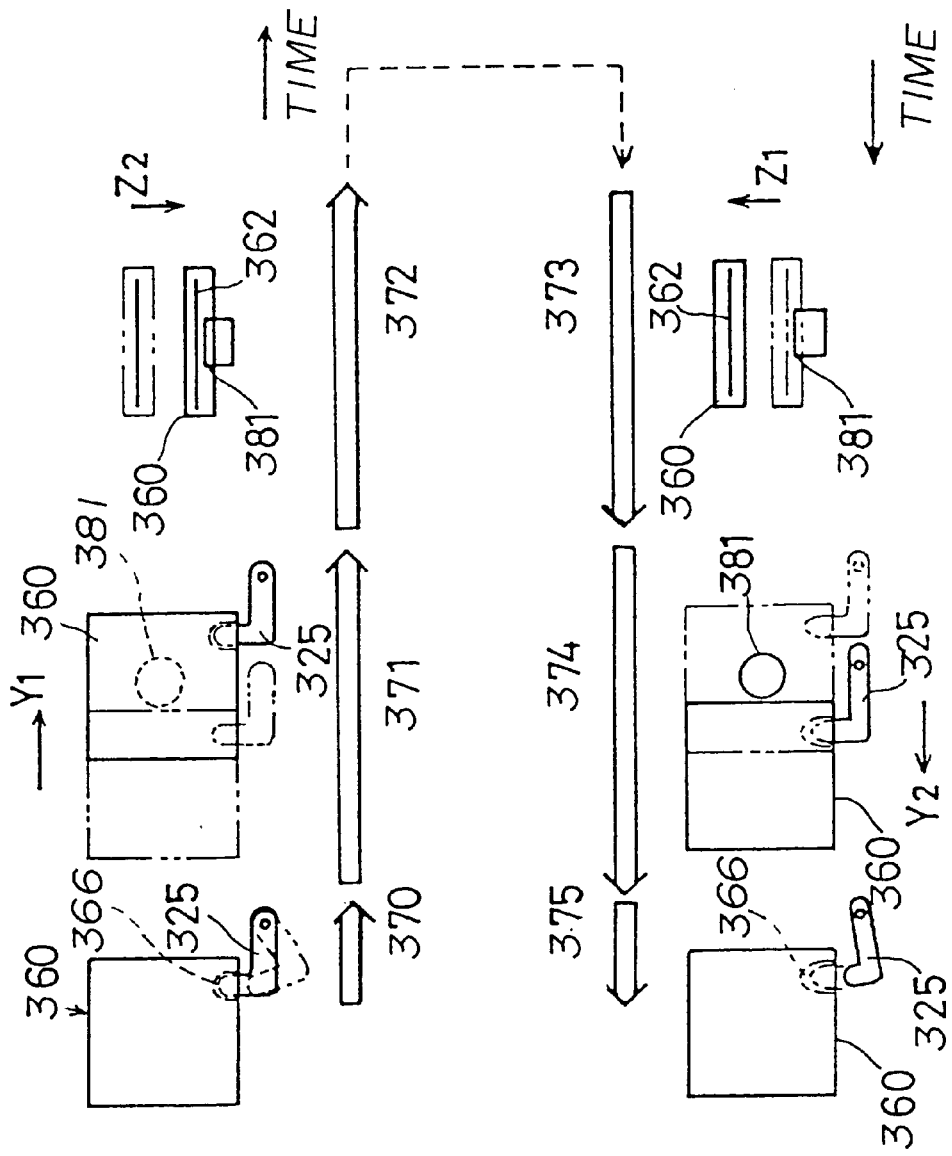
FIGS. 24A and 24B illustrate cartridge loading/unloading operations in the disc device in the third embodiment.

How an automatic cartridge 360 loading operation and an automatic cartridge 360 unloading operation are performed will now be described. The automatic loading operation is started as a result of an operator inserts the mini-disc cartridge 360 to the mini-disc device. As shown in FIGS. 24A and 24B, the above-mentioned engagement operation 370, drawing operation 371, lowering operation 372 are performed in this order.

The hook lever 325 is rotated along the $A_1$ direction as shown in FIG. 18A, and thus is located at the disengagement position $P_1$. Then, the operator inserts the cartridge 360, in a position shown in FIG. 19, into the inserting hole 314, along the $Y_1$ direction, to a predetermined position. The mini-disc cartridge 360 does not come into contact with the hook 325a and thus only a small force is required for the insertion. During the insertion, a locking of the shutter 363 of the cartridge 360 shown in FIG. 19 is released, a hole 363a of the shutter 363 is hooked by a hook member 380 with a click, the shutter 363 thus slides relatively along the $Y_2$ direction and thus is opened as the cartridge is moved along the $Y_1$ direction; and thus a part of the magneto-optical disc 362 is bared.

Further, this cartridge 360 insertion is detected by the mini-disc device which as a result causes the loading motor 326 to rotate forward. As a result, the rack plate 323 is moved along the $Y_1$ direction through the gear mechanism 330 as indicated by a line $390_{-1}$ shown in FIG. 25A. During the rack plate 323 movement along the $Y_1$ direction, the above-mentioned engagement operation 370, drawing operation 371 and lowering operation 372 shown in FIG. 24A are performed one by one.

Figure 25:
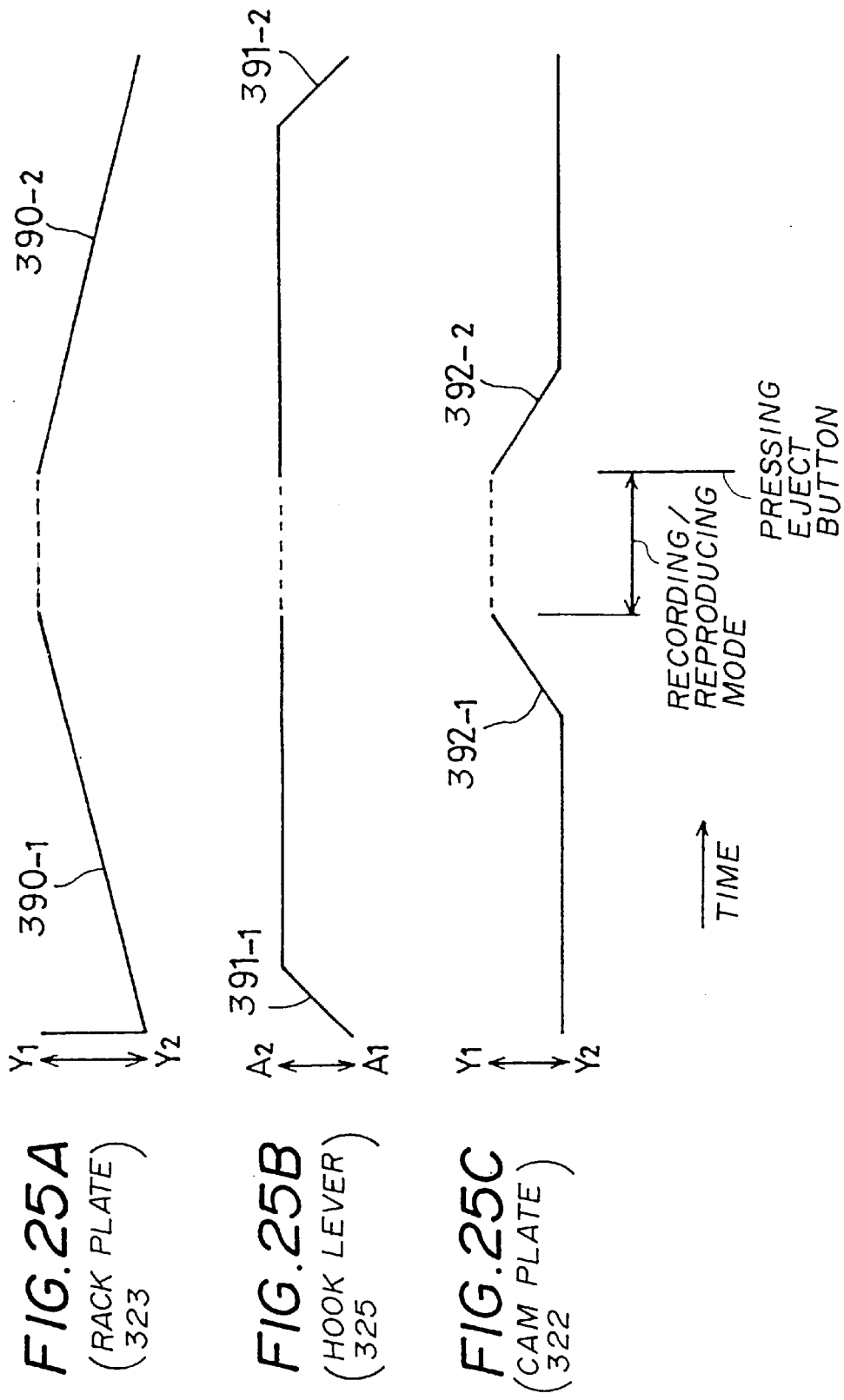
FIGS. 25A, 25B and 25C illustrate movement of each of a rack plate, a hook lever and a cam plate of in the disc device in the third embodiment in the cartridge loading/unloading operations.

In the engagement operation 370, at a time at which the movement of the rack plate 323 is started, the pin 332 of the hook lever 325 is moved along the $X_2$ direction by the inclined part $323a_{-1}$ of the hole 323a of the rack plate 323, as shown in FIG. 23. As a result, the hook lever 325 is rotated along the $Y_2$ direction. A line $391_{-1}$ shown in FIG. 25B shows this rotation. Thereby, as also shown in FIG. 18B, the hook 325a enters the concave portion 366 of the cartridge body 361. Thus, the cartridge 360 is locked by the engagement between the hook 325a and the concave portion 366.

In the subsequent drawing operation 371, the rack plate 323 is further moved along the $Y_1$ direction. In the above-mentioned engagement operation, the pin 332 of the hook lever 325 moves along the $X_2$ as mentioned above. As a result, the top portion of the pin 332 moves along the $X_2$ direction in the L-shaped groove 321b of the overhanging portion 321a of the holder 321 in a part thereof extending along the $X_1$ and $X_2$ directions. As a result, the top portion of the pin 332 reaches the $X_1$ directional end of the $X_1$–$X_2$ extending part of the L-shaped groove 321b and thus may move along the $Y_1$ direction in the L-shaped groove 321b in a part thereof extending along the $Y_1$ and $Y_2$ directions.

As a result, the hook lever 325 and the supporting plate 324 are moved along the $Y_1$ direction as a result of following the movement of the rack plate 323 due to the pulling force of the spring 333 shown in FIG. 23. The pin 332 is moved along the $Y_1$ direction in a state in which the pin 332 is held by the corner part $323a_{-2}$ of the hole 323a. Thus, the hook lever 325 is moved along the $Y_1$ direction in a state in which the hook lever 325 has been rotated along the $A_2$ direction. Thus, the cartridge 360 in a state in which the shutter is opened is drawn to a predetermined position into the holder 321 as shown in FIG. 18C.

In the lowering operation 372, the last of the above-mentioned movements of the rack plate 323 along the $Y_{-1}$ direction, the cam plate 322 is pressed by the rack plate 323. As a result, the cam plate 322 is moved along the $Y_1$ direction as indicated by a line $392_{-1}$ shown in FIG. 25C. At this time, the cam cut-out 322c and 322d of the cam plate 322 guide the projections 321c and 321d of the holder 321 respectively. Thus, the holder 321 is lowered along the $Z_2$ direction. As a result, the mini-disc cartridge 360 held by the holder 321 is together lowered in the $Z_2$ direction and as a result is loaded in a predetermined position. Thus, the magneto-optical disc 362 is loaded on a turntable 381 shown in FIG. 21.

Then the magneto-optical disc 362 is rotated by the disc motor 327, the auxiliary field coil 329 comes in close proximity to the top surface of the magneto-optical disc 362, and the optical head 328 moves along the $X_1$ and $X_2$ directions together with the auxiliary field coil 329. Thus, information is recorded on the magneto-optical disc 362 and information is reproduced from the magneto-optical disc 362.

A relationship between the hook lever 325 and mini-disc cartridge 360 will now be described. When the hook lever 325 is in the engagement position $P_2$ as shown in FIG. 18C, the hook 325a is fitted to the concave portion 366, but no significant force along the direction $A_2$ is applied to the hook lever 325 in the structure described above with reference to FIG. 23. As a result, in the cartridge holder 321, no significant force along the $X_2$ direction is applied to the mini-disc cartridge 360 by the hook 325a. Therefore, the cartridge 360 is prevented from being tightly held at the $X_2$ side in the holder 321. Thus, the cartridge 360 is loosely held in the holder 321 in a condition in which the cartridge 360 can move slightly in the holder 321 due to slight clearances present between the cartridge 360 and holder 321. Therefore, the mini-disc cartridge 360 can be stably, adequately loaded in the mini-disc device.

Further, after the cartridge 360 has been loaded in the mini-disc device, because no significant force is applied to the cartridge 360 as mentioned above, the magneto-optical disc 362 can be adequately rotated in the cartridge 361. Thus, adequate information recording/reproducing can be performed in the mini-disc device.

When the eject button 316 is pressed after the recording/reproducing operations have been finished, the reversely directional rotation of the loading motor 326 is started. As a result, the rack plate 323 is moved in the $Y_2$ direction via the gear mechanism 330, as indicated by a line $390_{-2}$ shown in FIG. 25A. While the rack plate 323 is moving along the $Y_2$ direction, as shown in FIG. 24B, the lifting operation 373, pressing operation 374, and disengagement operation 375 are performed in this order.

In the lifting operation 373, the cam plate 322 moves together with the rack plate 323 as a result of the spring 338 shown in FIG. 23 pulling the cam plate 322 along the $Y_2$ direction, as indicated by a line $392_{-2}$ shown in FIG. 25C. At this time, the cam cut-outs 322c, 322d of the cam plate 322 guide the projections 321c, 321d of the holder 321 respectively, and thus the holder 321 is lifted along the $Z_1$ direction. As a result, the cartridge 360 rises together with the holder 321, and thus the magneto-optical disc 362 is removed from the turntable 381 shown in FIG. 21.

In the subsequent pressing operation 374, the movement of the cam plate 322 is stopped as a result of $Y_1$-end edges of holes 322f formed in the cam plate 322 coming into contact with projections 320c provided on the chassis 320 and thus preventing them from further moving. Only the movement of the rack plate 323 along the $Y_2$ direction is further continued. In response to the corner part $323a_{-2}$ of the hole 323a of the rack plate 323 pressing the pin 332 of the hook lever 325, the hook lever 325 moves along the $Y_2$ direction together with the supporting plate 324. As a result, the cartridge 360 is pressed and thus is moved along the $Y_2$ direction.

In the disengagement operation 375, the last in the movement of the rack plate 323 along the $Y_2$ direction, the pin 332 of the hook lever 325 is moved along the $X_1$ direction as a result of being guided by the inclined part $323a_{-1}$ of the hole 323a of the rack plate 323. Accordingly, the hook lever 325 is rotated along the $A_1$ direction as indicated by a line $321_{-2}$ shown in FIG. 25B. As a result, as indicated by a chain double-dashed line shown in FIG. 18B, the hook 325a retreats and thus is disengaged from the concave portion 366m of the cartridge 360. Then, the operator may draw out the cartridge 360, a part of which has projected from the mini-disc device due to the above-mentioned pressing operation 374. Because the hook 325a is disengaged from the concave portion 366 of the cartridge 360 as mentioned above, no significant force is required for drawing out the cartridge 360 from the mini-disc device.

Application of the present invention such as that applied in the third embodiment is not limited to the embodiment. It is also possible to apply it to other disc devices such as CD devices, CD-ROM devices, and magnetic disk devices in which relevant discs (disks) are automatically loaded.

As described above, according to the present invention such as that applied to the third embodiment, the engaging member such as the hook lever does not apply a significant force to the disk cartridge after the engagement of the engaging member with the cartridge has been completed. As a result, the cartridge is prevented from being tightly held in the holder at one side, and thus the cartridge loading can be performed smoothly. Further, the recording/reproducing operations can be performed stably.

Further, the engaging member is disengaged from the cartridge during the cartridge inserting/drawing operations performed by an operator. As a result, these operations can be performed with a light force. Thus, operations of the disk device can be easily performed.

Further, by performing the movement of the engaging member along the cartridge engagement/disengagement directions ($A_1$ and $A_2$) and that along the cartridge loading/unloading directions ($Y_1$ and $Y_2$) through a common mechanism unit, the following advantages can be obtained. The movement of the engaging member along the cartridge engagement/disengagement directions and that along the cartridge loading/unloading directions can be continued smoothly. Thus, stable automatic cartridge loading/unloading can be achieved.

Figure 27:
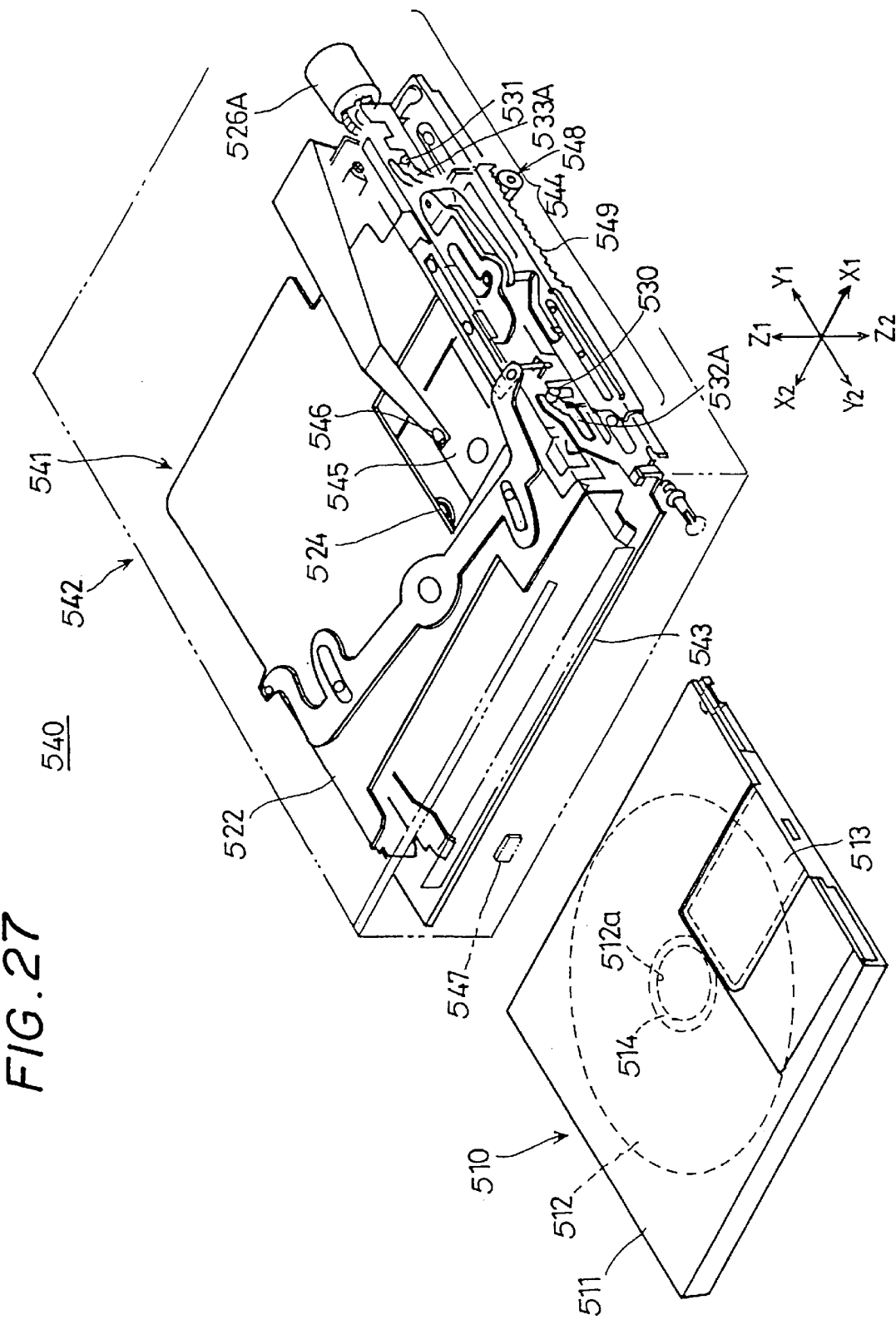
FIG. 27 shows an internal perspective view of the mini-disc device in the fourth embodiment.

FIGS. 27, 28A and 28B show a mini-disc device 540 in a fourth embodiment of the present invention. Reference numerals the same as those given to components shown in FIGS. 6A and 6B are given to corresponding components shown in FIGS. 27, 28A and 28B. In the mini-disc device 540, a device body 541 is incorporated in a box 542. The device body 541 has a chassis 543, a cartridge automatic loading mechanism 544, an optical head 545, an auxiliary field coil 546, a turntable 524, and a disc motor 525.

When a part of a magneto-optical disc cartridge 510 shown in FIG. 27 is inserted into the mini-disc device 540 along a $Y_1$ direction, a shutter 513 of the cartridge 510 is opened, and a loading motor 526A shown in FIG. 27 is started. Thus, the automatic loading mechanism 544 operates, and thus a state of the mini-disc device 540 is changed from a state shown in FIG. 28A into a state shown in FIG. 28B. Specifically, when the automatic loading mechanism 544 operates, the cartridge 510 is drawn into a holder 522, and then is lowered along a $Z_2$ direction together with the holder 522. As a result, the magneto-optical disc 512 is loaded on the turntable 524. Then, the disc 512 is rotated by the disc motor 525, and the optical head 545 and auxiliary field coil 546 are used for recording information on the disc 512 or reproducing information from the disc 512.

When an unloading button 547 shown in FIG. 27 is pressed, the automatic loading mechanism 544 operates reversely and thus a state of the disc device 540 is changed from the state shown in FIG. 28B to the state shown in FIG. 28A. Specifically, the holder 522 is lifted along a $Z_1$ direction, and this time the disc 512 is removed from the turntable 524. Then, the cartridge 510 is moved along a $Y_2$ direction and then is ejected from the mini-disc device 540.

The automatic loading mechanism 544 has the holder 522, the loading motor 526A, a gear mechanism 548 and a lift/lower cam plate 523A. The loading motor 526A has a torque smaller than the loading motor 526 used in the disc device in the related art shown in FIGS. 6A and 6B. Therefore, the motor 526A is smaller and cheaper than the motor 526. The lift/lower cam plate 523A has inclined cam cut-outs 532A and 533A formed therein.

Figure 26:
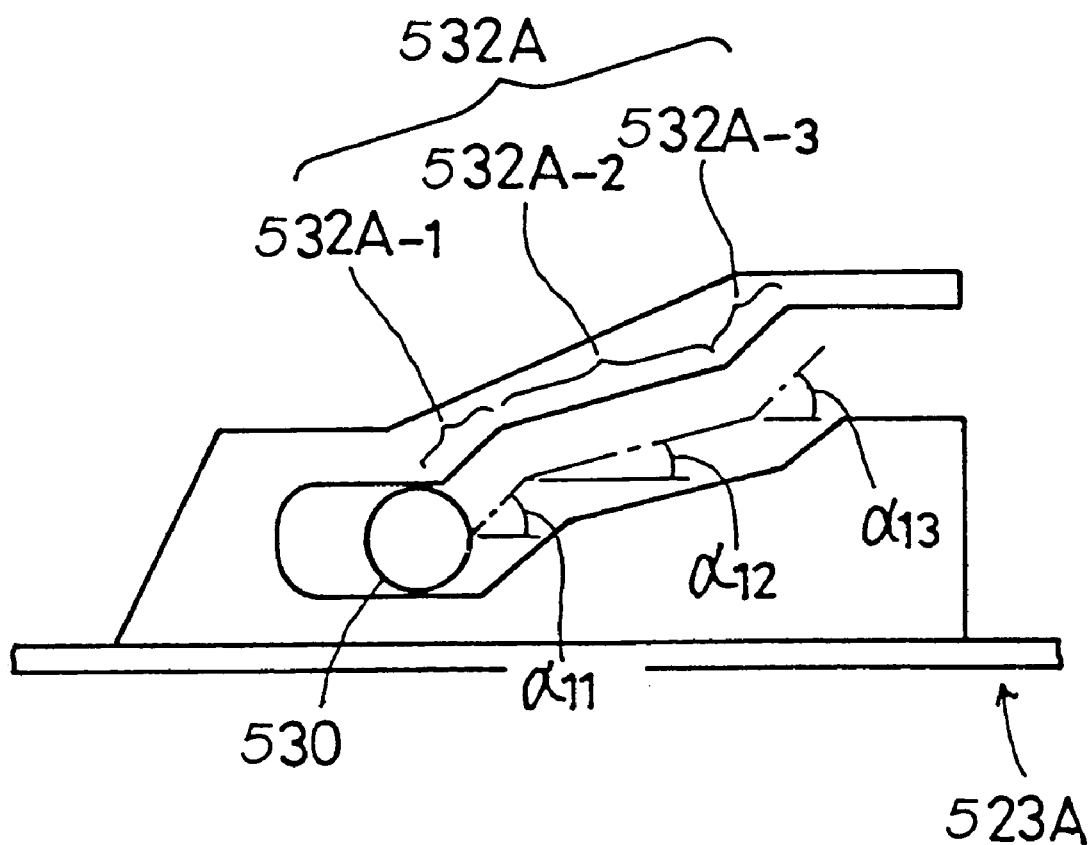
FIG. 26 shows an inclined cam cut-out formed in a lift/lower cam plate in a mini-disc device in a fourth embodiment of the present invention.

As shown in FIG. 26, the inclined cam cut-out 532A includes a first inclined cam cut-out portion $532A_{-1}$, a second inclined cam cut-out portion $532A_{-2}$, and a third inclined cam cut-out portion $532A_{-3}$. The three inclined cam cut-out portions $532A_{-1}$, $532A_{-2}$ and $532A_{-3}$ are arranged in this order from the bottom-left to the top-right in the figure. Each of the three inclined cam cut-out portions $532A_{-1}$, $532A_{-2}$ and $532A_{-3}$ extends straightly. The three inclined cam cut-out portions $532A_{-1}$, $532A_{-2}$ and $532A_{-3}$ have inclined angles $\alpha_{11}$, $\alpha_{12}$ and $\alpha_{13}$, respectively. The angle $\alpha_{11}$ is equal to the angle $\alpha_{13}$, and the angle $\alpha_{12}$ is smaller than each of the angles $\alpha_{11}$ and $\alpha_{13}$. These angles and an inclined angle $\alpha_1$ of the inclined cam cut-outs 532 and 533 shown in FIG. 6A have the following relationship:

$\alpha_{12} < \alpha_{11}, \alpha_{13}$;
$\alpha_{11} = \alpha_{13}$;
$\alpha_{12} < \alpha_1$; and
$\alpha_{11}, \alpha_{13} > \alpha_1$.

The other inclined cam groove 533A of the lift/lower cam plate 532A has the shape same as that of the inclined cam cut-out 532A.

Further, in addition to the right lift/lower cam plate 532A, another left lift/lower cam plate is provided at the opposite side of the holder 522. The two cam plates are lined by a link and have a relationship similar to the above-mentioned relationship of the two lift cam plates 6L and 6R in the first embodiment shown in FIG. 8. The left lift/lower cam plate in the fourth embodiment has inclined cam cut-outs similar to the inclined cam cut-outs 532A and 532B of the right one shown in FIG. 26. However, just as the inclining directions of the cut-outs 6d are reverse between the two lift cam plates 6L and 6R as mentioned above in the first embodiment with reference to FIG. 8, an inclining direction of each of the inclined cam cut-outs of the left lift/lower cam plate in the fourth embodiment is reverse of that shown in FIG. 26. That is, if each of the inclined cam cut-out of the left lift/lower cam plate is viewed from the left side (a $X_2$ side) thereof or externally, the shape thereof is the same as that shown in FIG. 26.

A cartridge 510 unloading operation will now be described. A rotation of the loading motor 526A is transmitted to a rack 549 of the lift/lower cam plate 523A, shown in FIG. 27, via the gear mechanism 548. As a result, the lift/lower cam plate 523A is driven to slide along the $Y_1$ direction the distance $l_1$ shown in FIG. 28A, which is equal to the distance $l_1$ shown in FIG. 6A. As the lift/lower cam plate 523A slides as mentioned above, the following first, second and third steps of operation are performed in this order.

In the first, second and third steps, the first inclined cam cut-out portion $532A_{-1}$, second inclined cam cut-out portion $532A_{-2}$, and third inclined cam cut-out portion $532A_{-3}$, guide the projection 530 of the holder 522, respectively. Simultaneously, the rear inclined cam cut-out 533A guides the relevant projection 531 in the same manner. Further, simultaneously, the two inclined cam cut-outs of the left lift/lower cam plate guide relevant left projections of the holder 522 in the same manner but along the reverse direction. Thus, the holder 522 is lifted to the top position.

In the second step, the magneto-optical disc 512 is pressed up by the holder 522 and thus is removed from the turntable 524. The removal of the disc 512 from the turntable 524 is performed against a magnetic force in which the permanent magnet 527 of the turntable 524 attracts the clamp plate 514 of the disc 512. Thus, a large force is required to lift the holder 522 in the second step. In this step, the second inclined cam cut-out portion $532A_{-2}$ having the inclined angle $\alpha_{12}$ smaller than the above-mentioned $\alpha_1$ in the related art is used for lifting the holder 522. As a result, in the second step, a ratio of a distance which the projection 530.is lifted along the $Z_1$ direction to a distance which the lift/lower cam plate 523A moves along the $Y_2$ direction is smaller than a relevant ratio in the related art shown in FIG. 6A.

Figure 29:
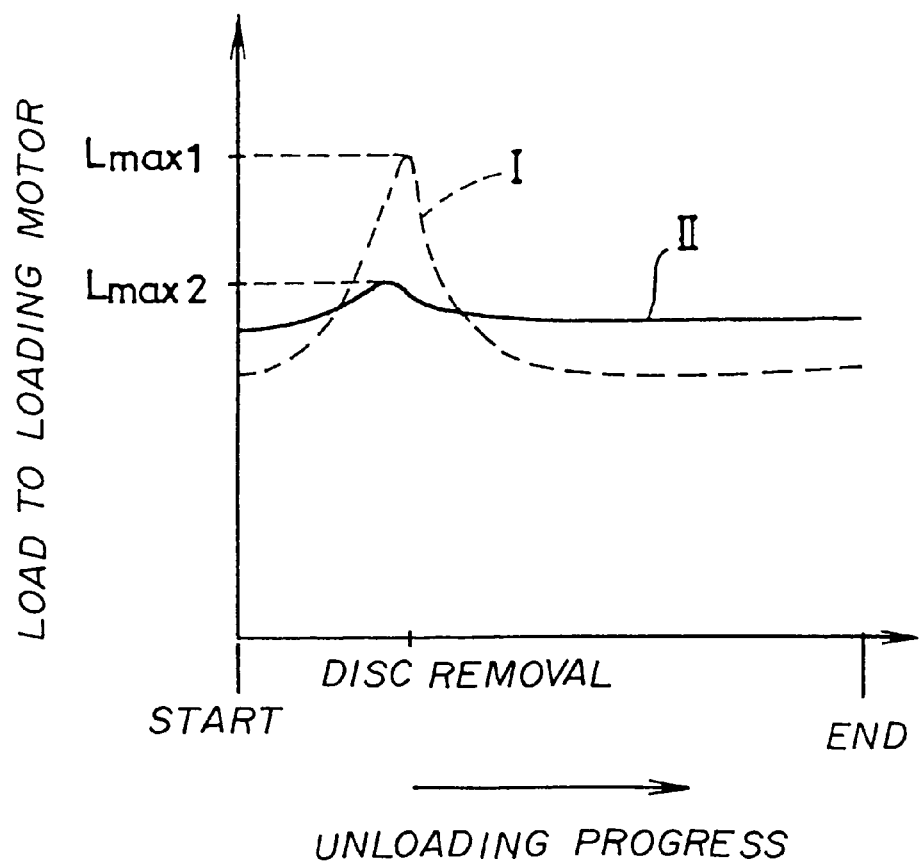
FIG. 29 shows variations of loads borne by a loading motor during the cartridge unloading operation in the related art and in the fourth embodiment.

Because this ratio is small in the second step in the fourth embodiment, a large force can be applied to the holder 522 to lift it along the $Z_1$ direction even if a small force is applied to the lift/lower cam plate 523 to move it along the $Y_2$ direction. A broken curve I shown in FIG. 29 shows a variation of a load borne by the loading motor in the related art shown in FIGS. 6A and 6B. A solid curve shown in FIG. 29 shows a variation of a load borne by the loading motor in the fourth embodiment. In the related art, the inclined angle $\alpha_1$ is uniform over each of the inclined cut-outs as shown in FIG. 6A. As a result, a variation of the load borne by the holder 522 corresponds to the variation of the load borne by the loading motor. The load borne by the holder 522 has a sharp peak when the clamp plate 514 of the disc 512 is removed from the permanent magnet 527 of the turntable 524. Accordingly, the load borne by the loading motor has the sharp load peak Lmax1 at the same time as shown in FIG. 29.

In contrast to this, in the fourth embodiment of the present invention, the inclined cam cut-out 532A has the small inclined angle in the middle thereof corresponding to the second step in which the clamp plate 514 of the disc 512 is removed from the permanent magnet 527 of the turntable 524. Thus, the large force borne by the holder 522 in this step is controlled and thus the variation (solid curve II) of the load borne by the loading motor 526A has a blunt peak Lmax2 (smaller than Lmax1) shown in FIG. 29. As a result, the cartridge unloading operation can be performed smoothly. In a cartridge loading operation, a step in which a large force is borne by the loading motor 526A is not present. Therefore, the load borne by the loading motor 526A is approximately uniform during the cartridge loading operation.

As a result, the required maximum torque to be generated by the loading motor 526A in the fourth embodiment is one which corresponds to the above-mentioned load Lmax2. Thus, the loading motor 526A the required in the fourth embodiment can be miniaturized and costs thereof can be reduced in comparison to that required in the related art shown in FIGS. 6A and 6B. Accordingly, it is possible to miniaturize and reduce in its costs the mini-disc device 540 in the fourth embodiment in comparison to the mini-disc device 520 in the related art shown in FIGS. 6A and 6B.

Application of the present invention such as that applied to the fourth embodiment is not limited to the fourth embodiment. It is also possible to control the load of the loading motor in a step other than the step in which the clamp plate 514 of the disc 512 is removed from the permanent magnet 527 of the turntable 524. The control of the load may be performed in the same manner in which each inclined cam cut-out has a small inclined angle corresponding to the relevant step.

Figure 30:
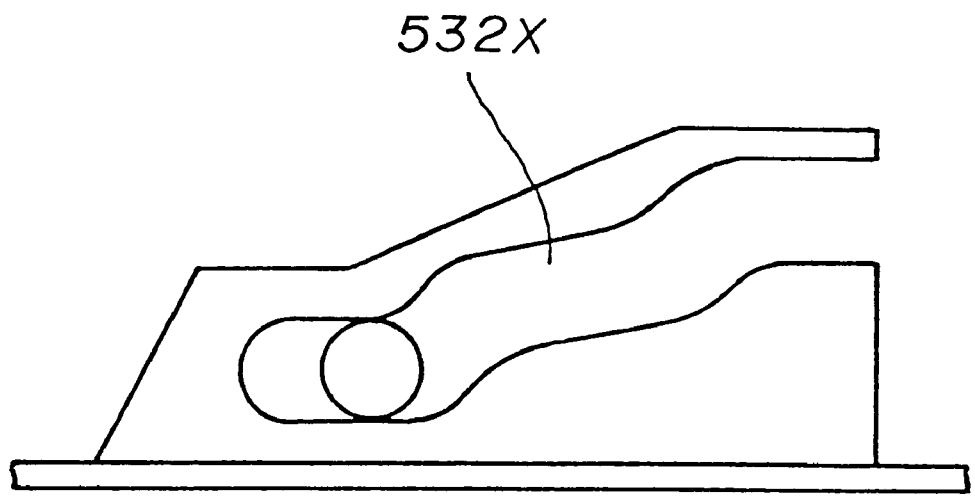
FIG. 30 shows a variant of the inclined cam cut-out shown in FIG. 26.

Further, a shape of the inclined cam cut-outs is not limited to that shown in FIG. 26 in which each one of the inclined cam cut-out portions extends straightly. As indicated by an inclined cam cut-out 532X shown in FIG. 30, it is also possible that the inclined cam cut-outs have curved parts. Thereby, similar functions can be obtained.

Further, application of the present invention is not limited to such a mini-disc device, and the present invention can also be applied to cartridge-type magnetic disk devices and cartridge-type optical disc devices.

Thus, by forming the inclined cam cut-outs using a plurality of inclined cam cut-out portions having different inclined angles, a load of the loading motor can be controlled. Specifically, the inclined cam cut-outs may have small inclined angles corresponding to a step in which the load of the loading motor is required to be controlled. As a result, it is possible to make the load of the loading motor uniform during the cartridge unloading operation. Thereby, it is possible to miniaturize and reduce costs of the loading motor and thus the mini-disc device containing the loading motor. Further, it is possible to achieve the smooth cartridge unloading operation.

Figure 32:
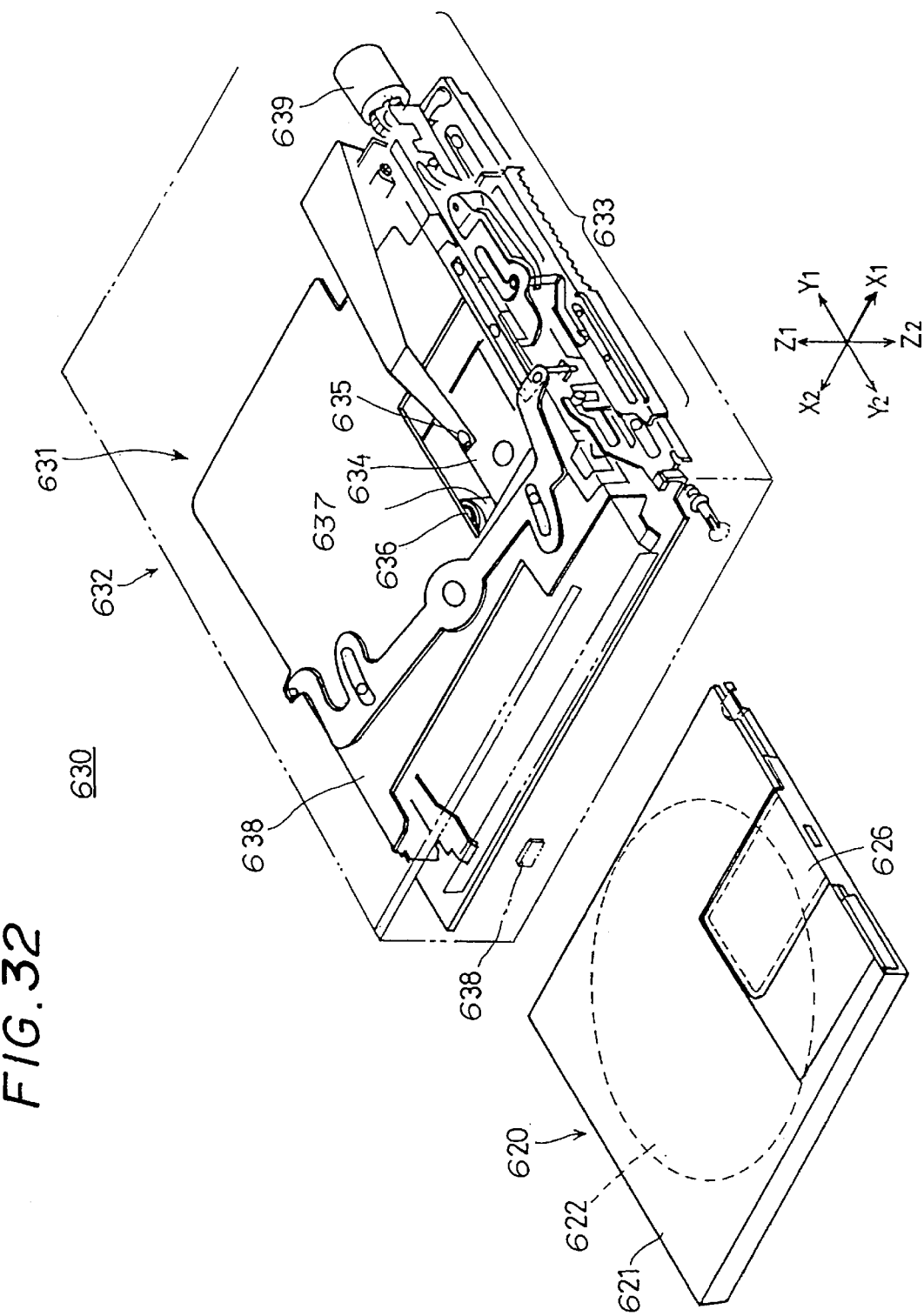
FIG. 32 shows a perspective internal view of the mini-disc device in the fifth embodiment.

FIG. 32 shows a mini-disc device 630 in a fifth embodiment of the present invention. In the mini-disc device 630, a device body 631 is incorporated in a box 632. The device body 631 has a cartridge automatic loading mechanism 633, an optical head 634, an auxiliary field coil 635, a turntable 636, and a disc motor 637.

When a part of a magneto-optical disc cartridge 620 shown in FIG. 32 is inserted into the mini-disc device 630 along a $Y_1$ direction, a shutter 626 of the cartridge 630 is opened, and the automatic loading mechanism 633 operates. As a result, the cartridge 620 is drawn into a holder 638, and then is lowered along a $Z_2$ direction together with the holder 638. As a result, a magneto-optical disc 622 is loaded on the turntable 636. Then, the disc 622 is rotated by the disc motor 637, and the optical head 634 and auxiliary field coil 635 are used for recording information on the disc 622 or reproducing information from the disc 622.

When an unloading button 638 shown in FIG. 32 is pressed, the automatic loading mechanism 633 operates reversely, and thus the holder 638 is lifted along a $Z_1$ direction, and this time the disc 622 is removed from the turntable 636. Then, the cartridge 620 is moved along a $Y_2$ direction and then is ejected from the mini-disc device 630.

Figure 31:
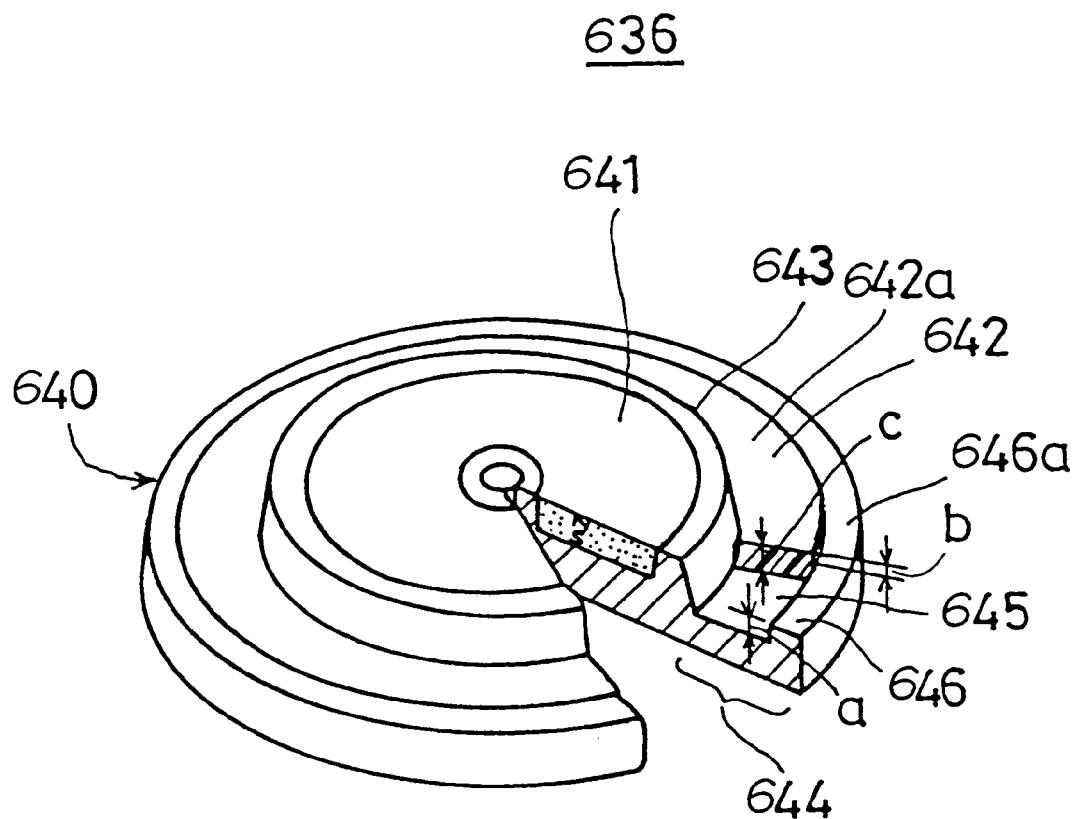
FIG. 31 shows a magnified perspective and partially cut-out view of a turntable in a mini-disc device in a fifth embodiment of the present invention.

FIG. 31 shows the turntable 636. The turntable 636 includes a plastic or metal turntable body 640, a permanent magnet 641 and a rubber sheet 642. The turntable body 636 includes a center hub portion 643 for centering the magneto-optical disc 622, and a ring-shaped table portion extending outward from the center hub portion 643. The ring-shaped permanent magnet 641 is incorporated in the center hub portion 643. A ring-shaped concave portion 645 having a depth of 'a' is formed on the top surface of the table portion 644. Thus, a ring-shaped projection 646 is formed at the outer side of the concave portion 645 and projects higher than the concave portion 645.

The ring-shaped rubber sheet 642 is fitted in the concave portion 645, and has a thickness 'c' slightly larger by a length 'b' than the depth 'a' of the concave portion 645. Therefore, after fitting the rubber sheet into the concave portion 645, the top surface of the rubber sheet 642 projects the height 'b' from the top surface of the ring-shaped projection 646. When the magneto-optical disc 622 is loaded on the turntable 636, the rubber sheet 642 is compressed and thus is reduced in its thickness by the height 'b'.

Figure 7:
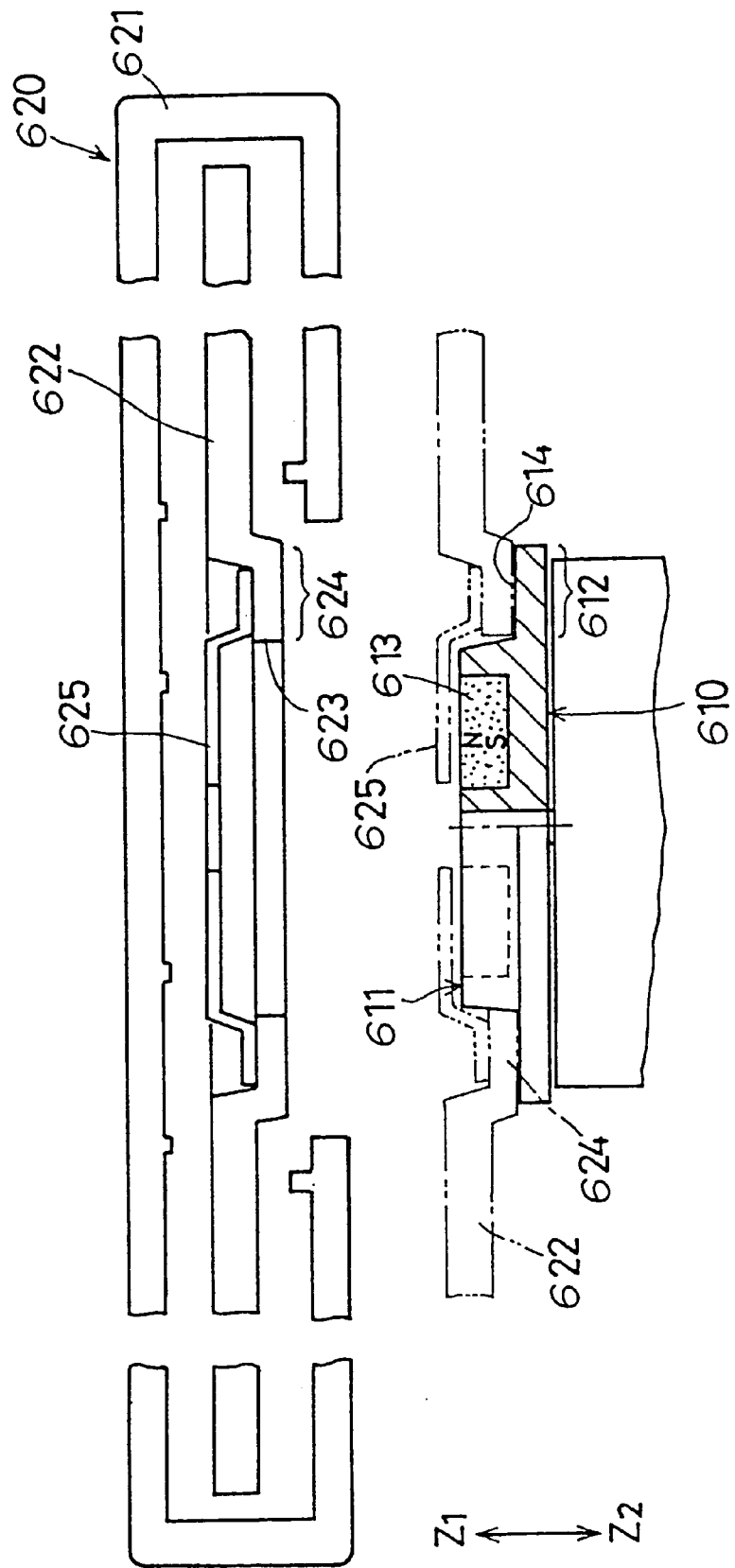
FIG. 7 shows a turntable in a disc device in the related art.
Figure 33:
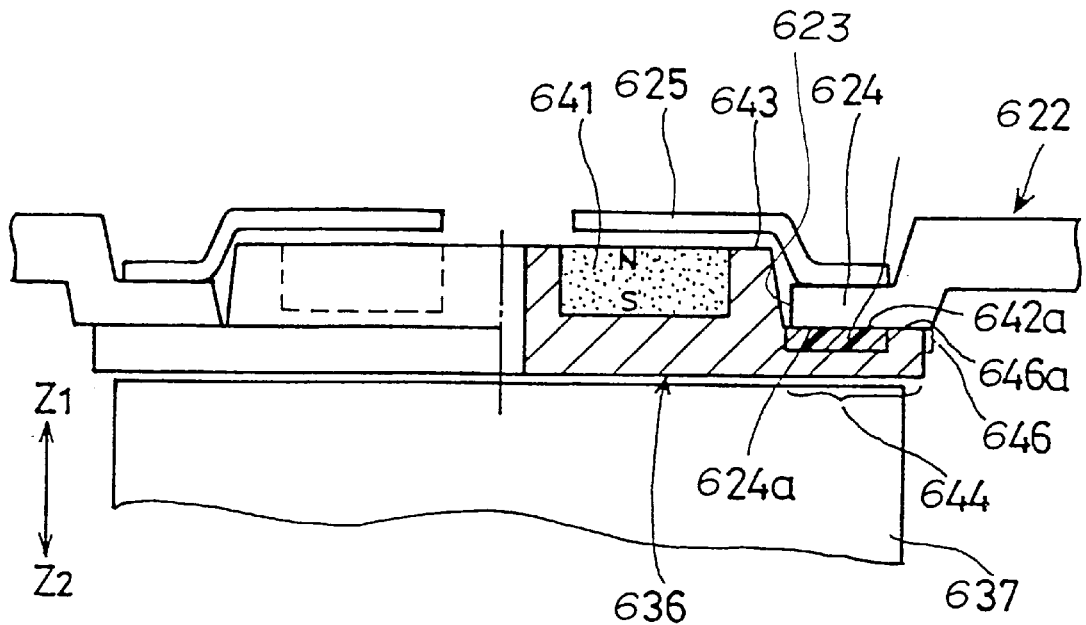
FIG. 33 shows an elevational partial sectional view of a state in which a magneto-optical disc is loaded on the turntable in the device shown in FIG. 32.

A state in which the magneto-optical disc 622 is loaded on the turntable 636 will now be described with reference to FIG. 33. Similarly to the case shown in FIG. 7, a clamp plate 625 of the disc 622 is magnetically attracted by the permanent magnet 641 and thus a center hole 623 of the disc 622 is fitted by the center hub portion 643. Further, a center ring portion 624 of the disc 622 is pressed onto the table portion 644. Thus, the disc 622 is loaded on the turntable 636.

In this state, an outer part of the center ring portion 624 is pressed onto the top surface 646a of the ring-shaped projection 646. Thereby, the disc 622 is positioned at a predetermined height. The remaining part of the center ring portion 624 extending from a position slightly inside from the outer edge thereof to the center hole 623 (thus being most of the center ring portion) is pressed onto the top surface 642a of the rubber sheet 642. As mentioned above, when the magneto-optical disc 622 is loaded on the turntable 636, the rubber sheet 642 is compressed and thus is reduced in its thickness by the height 'b'. As a result, the top surfaces of the ring-shaped projection 646 and the rubber sheet 642 are lying in the same plane. In the state after the disc 622 has been loaded on the turntable 636, the bottom surface 624a of the center ring portion 624 is surely pressed onto the top surface 642a of the rubber sheet 642.

Further, the rubber sheet 642 is compressed so that the bottom surface 624a of the center ring portion 624 of the disc 622 comes into contact with the top surface 646a of the ring-shaped projection 646. Thus, as mentioned above, the height of the disc 622 in the loaded state only depends on the height of the top surface 646a of the ring-shaped projection 646. Thus, the height of the disc 622 in the loaded state can be accurately fixed without being affected by the rubber sheet 642.

A static friction coefficient of a surface of a magneto-optical disc such as the disc 622 to a rubber member is greatly larger than that to a plastic member. Because most of the center ring portion 624 is pressed onto the top surface 642a of the rubber sheet 642 as mentioned above, a possibility of slipping of the magneto-optical disc 622 on the turntable 636 in the loaded state is very slight.

As a result, it is possible to increase a rated rotation speed of the magneto-optical disc 622 in the mini-disc device 630. It is possible that the mini-disc device 630 in the fifth embodiment has a rated disc 622 rotation speed which is several times that of the mini-disc device in the related art shown in FIG. 7. Then, because the larger friction coefficient is provided by the rubber sheet 642, no slipping of the disc 622 on the turntable 636 occurs even at the increased disc rotation speed. By increasing the rated disc 622 rotation speed, it is possible to apply the mini-disc device in the fifth embodiment to a computer apparatus so that it is used for recording data on/reproducing data from the disc 622.

Further, it is possible to miniaturize the mini-disc device. As long as the mini-disc device is used for recording/reproducing voice signals, it is not necessary to increase the rated disc 622 rotation speed. Therefore, instead of increasing the rotation speed, it is possible to reduce a magnetic coercive force of the permanent magnet 641. Even if the magnetic coercive force is reduced, because the larger friction coefficient is provided by the rubber sheet 642, no slipping of the disc 622 on the turntable 636 occurs in the original rated disc rotation speed. Further, by reducing the magnetic coercive force of the permanent magnet 641, a force required for removing the magneto-optical disc 622 from the turntable 636 can be reduced, and thus, a load borne by the loading motor 639 therefor can be reduced. As a result, it is possible to miniaturize the loading motor and thus the device body 631 of the mini-disc device 630.

The present invention is not limited to providing the rubber sheet 642 and it is also possible to use a sheet made of a material having properties similar to those of the rubber for the same purpose.

Figure 34:
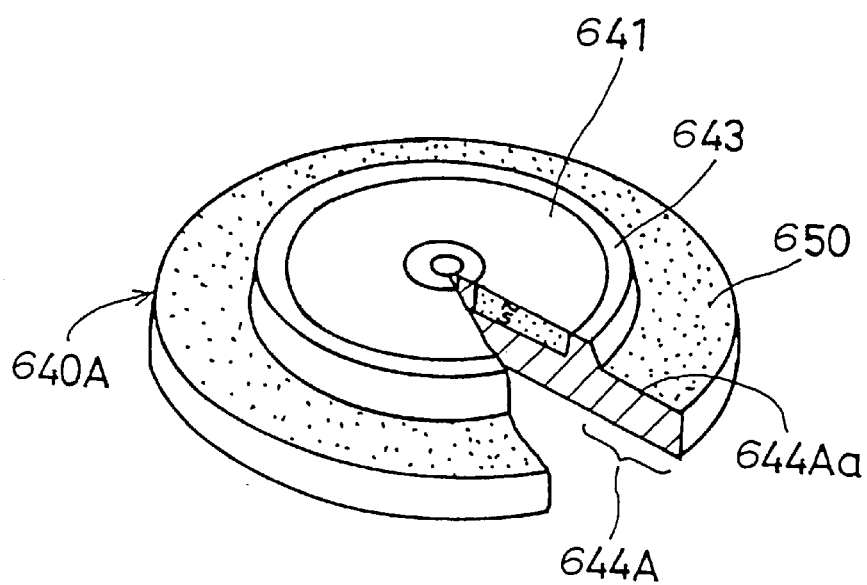
FIG. 34 shows a magnified perspective and partially cut-out view of a turntable in a variant of the turntable shown in FIG. 31.

FIG. 34 shows another example of the turntable according to the present invention. The turntable 636A has a rubber film instead of the rubber sheet 642 in the above-described turntable 636. The turntable 636A has a turntable body 640A, the permanent magnet 641 and the rubber film 650. The turntable body 640A has the center hub portion 643 and a ring-shaped table portion 644A. The permanent magnet 641 is incorporated in the center hub portion 641. The ring-shaped table portion 644A has a planer top surface 644a. A rubber material is coated on the planer top surface 644a of the table portion 644A, and thus a very thin rubber film 650 is provided thereon.

The magneto-optical disc 622 is pressed onto the rubber film 650, and thus is loaded on the turntable 636A in a state in which slipping of the disc 622 on the turntable 636A is not likely to occur similar to the case of the turntable 636 being used. A thickness of the rubber film 650 is thin as mentioned above, for example, less than approximately 0.5 mm. Therefore, the height of the disc 622 in the loaded state can be accurately fixed. It is also possible to use a film of a material having properties similar to those of the rubber, instead of the rubber film 650.

Thus, in the present invention such as that applied to the fifth embodiment, by enlarging a static friction coefficient between the disk and turntable, slipping of the disk on the turntable can be surely prevented. As a result, it is possible to increase a rated disk rotation speed in the disk device. Further, it is possible to reduce a coercive magnetic force of the permanent magnet if the rated disk rotation is not increased. As a result, in the disk device in which the cartridge loading/unloading operations are performed automatically through the loading motor, a load borne by the loading motor when the disk is removed from the turntable can be reduced and thus it is possible to miniaturize the loading motor and thus the disk device.

Further, the present invention is not limited to the above-described embodiments, and variations and modifications may be made without departing from the scope of the present invention.

What is claimed is:

1. A disk device comprising:

a holder for holding a disk cartridge, said holder having a projection formed therein;

a cam plate having an inclined cam groove formed therein, said projection of said holder being inserted in said inclined cam groove so that said holder is moved along a first direction in response to said cam plate moving along a second direction different from said first direction, said inclined cam groove having successive different inclined angles between positions before and after said holder is moved in said first direction, wherein each portion of the inclined cam groove between said positions before and after said holder is moved in said first direction is inclined with respect to said second direction, said inclined cam groove includes at least three successive inclined cam groove portions, a first inclined cam groove portion of said three successive inclined cam groove portions being inclined at a first inclined angle with respect to said second direction, a second inclined cam groove portion of said three successive inclined cam groove portions being inclined at a second inclined angle with respect to said second direction, a third inclined cam groove portion of said three successive inclined cam groove portions being inclined at a third inclined angle with respect to said second direction, said second inclined cam groove portion being located between said first and third inclined cam groove portions, said first inclined angle being larger than said second inclined angle and said third inclined angle being larger than said second inclined angle.

2. The disk device according to claim 1, wherein said different inclined angles of said inclined cam groove are such that a power transmission ratio between said cam plate and said holder is controlled depending on a position at which said projection is located in said inclined cam groove.

3. A disk device comprising:

a holder for holding a disk cartridge, said holder having a projection formed therein;

a cam plate having an inclined cam groove formed therein, said projection of said holder being inserted in said inclined cam groove so that said holder is moved along a first direction in response to said cam plate moving along a second direction different from said first direction, said inclined cam groove having successive different inclined angles between positions before and after the holder is moved in said first direction, wherein said different inclined angles of said inclined cam groove are such that a power transmission ratio between said cam plate and said holder is controlled depending on a position at which said projection is located in said inclined cam groove, a turntable for loading thereon a disk contained in said disk cartridge; and a magnet provided in said turntable for attracting a clamp plate provided in said disk;

said different inclined angles of said inclined cam groove being such that a load carried by said cam plate is reduced when movement of said holder along said first direction due to movement of said cam plate along said second direction causes said clamp plate of said disk to be withdrawn from said magnet of said turntable.

* * * * *